US008254731B2

(12) United States Patent
Khomo

(10) Patent No.: US 8,254,731 B2
(45) Date of Patent: Aug. 28, 2012

(54) SPATIAL CHARACTER RECOGNITION TECHNIQUE AND CHIROGRAPHIC TEXT CHARACTER READER

(76) Inventor: Malome T. Khomo, LaGrange, IL (US)

( * ) Notice: Subject to any disclaimer, the term of this patent is extended or adjusted under 35 U.S.C. 154(b) by 652 days.

(21) Appl. No.: 12/498,275

(22) Filed: Jul. 6, 2009

(65) Prior Publication Data

US 2010/0002936 A1 Jan. 7, 2010

Related U.S. Application Data

(63) Continuation of application No. 10/840,905, filed on May 7, 2004, now abandoned, and a continuation-in-part of application No. 10/672,647, filed on Sep. 6, 2003, now Pat. No. 7,317,450.

(60) Provisional application No. 60/520,169, filed on Nov. 14, 2003, provisional application No. 60/542,309, filed on Feb. 6, 2004.

(51) Int. Cl.
 *G06K 9/22* (2006.01)
(52) U.S. Cl. .......................................... 382/314; 345/179
(58) Field of Classification Search .......... 345/179–183; 382/314
See application file for complete search history.

(56) References Cited

U.S. PATENT DOCUMENTS 5,276,771 A * 1/1994 Manukian et al. ............... 706/25
6,095,928 A * 8/2000 Goszyk ........................... 473/222
6,373,426 B1 * 4/2002 Hellsten ............................ 342/59
6,414,673 B1 * 7/2002 Wood et al. ..................... 345/173
7,750,891 B2 * 7/2010 Stephanick et al. ............ 345/173

FOREIGN PATENT DOCUMENTS

| JP | 10-187341 | 7/1998 |
| JP | 10-333815 | 12/1998 |
| JP | 2004-070688 | 3/2004 |

* cited by examiner

*Primary Examiner* — Matthew Bella
*Assistant Examiner* — Dennis Rosario
(74) *Attorney, Agent, or Firm* — McAndrews, Held & Malloy, Ltd.

(57) ABSTRACT

Disclosed herein is a configuration of a writing volume of a spatial chirographic reader facilitating an on-line method of recognition of handwriting characters. The writing volume may be partitioned by an ink depth into a positioning stereographic hemisphere and an inking stereographic hemisphere. Two projection spheres may be made to intersect on a projection typeface plane forming a disc encapsulating the writing volume. A center of the disc may be a universal reference point for converting handwriting movements of a stylus to inferred rotations. Characters may be mapped to reference rotations, wherein on-line reader data may be compared to effect identification of the characters. Labeling of cardinal positions and graduation of rotation paths may be configured such that inking strokes of a particular writing system may be observable in a minimal number of integer factors of rotation of π radians. An overriding convention of eliminating representations leading to ambiguity may also provide for apparent redundancy of representation by adjustment of the radius of the inferred sphere of rotation and partitioning of the typeface into segments having independent coordinates distinct from the principal axes. Enumeration of writing strokes may be constrained by recording radial torsion components to an inking axis and twist torsion components to a writing plane.

36 Claims, 5 Drawing Sheets

SPATIAL CHARACTER RECOGNITION TECHNIQUE AND CHIROGRAPHIC TEXT CHARACTER READER

RELATED APPLICATIONS

The present application hereby claims priority to Provisional Patent Application having U.S. Ser. No. 60/520,169 filed on Nov. 14, 2003, the complete subject matter of which is hereby incorporated herein in its entirety.

The present application also hereby claims priority to Provisional Patent Application having U.S. Ser. No. 60/542,309 filed on Feb. 6, 2004, the complete subject matter of which is hereby incorporated herein in its entirety.

The present application also is a continuation-in-part of Non-Provisional patent application having U.S. Ser. No. 10/672,647 filed on Sep. 6, 2003, the complete subject matter of which is hereby incorporated herein in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Handwriting is traditionally performed on a writing surface, such as paper, with an ink-dispensing pen or other writing instrument, such as a pencil, or paint brush that leaves a visible marking on the writing surface. The markings are expected to be understandable by human readers.

Recently, electronic handwriting has been done on planar X-Y digitizing pads using a stylus employed to simulate handwriting upon the pad to create an electronic facsimile of handwriting. The digitizing system collects an array of X-Y coordinates of pixels corresponding to the curve tracing positional points of a stylus tip on the pad. Usually the X-Y arrays are gathered and stored as positional arrays, and made discernible to a human reader when rendered upon an X-Y display, but the renderings are rarely discernible as readable text by an electronic device.

Attempts to make handwriting discernible as machine-readable text have concentrated on handwriting recognition of the X-Y traces by translation into binary coded text after affine transformation of the X-Y trace. Other techniques of recognition of the X-Y traces employ stochastic recognition based on various randomness assumptions using a statistical model. Other attempts with more deterministic techniques of recognition of the X-Y traces use velocity profiling in on-line recognition and forward search in batch recognition. Many similar X-Y trace recognition efforts have resulted in numerically intense algorithms which tend to restrict the recognition process to off-line batch processing, conducted as a separate procedure long after the writing has been done and the X-Y trace stored.

More recently, on-line recognition systems have dispensed with natural hand-writing and created specialized pen-stroke shorthand for letters of the Latin alphabet, Arabic numerals, and punctuation marks, such as an electronic stylus recognition system. Field experience has shown that recognition error rates are high enough to cause manufacturers to begin supplanting these systems with keypads and software keyboards. Miniaturized keypads are slow when compared to normal handwriting speed. Full-sized keyboards, although faster in use than miniature keyboards, are too cumbersome for many purposes.

Devices that track X-Y motion in true geometry exist in the form of analog joysticks. These may be used as actuators for simulations and as gaming input devices, where a band-held game controller may incorporate an analog joystick that permits tracking of directional inputs about 360 degrees around an action reference point, and is small enough to be manipulated by a finger tip. The cited range of 360 degrees signifies that the joystick spans a projection of the X-Y plane, but does not span a radial distance, i.e., the joystick is not operable to span a projection along the Z-axis. This is because the range of each joystick sensor is less than the radial range needed to be spanned.

The cited joystick may utilize optical quadrature sensor wheels over two orthogonal axes of rotation. Such a configuration may suffice for directional control over a planar range, but is inadequate for the capture of natural handwriting strokes because the capture of natural handwriting strokes requires a depth sensor. A depth sensor may be adapted to enable the device to distinguish handwriting strokes or hand movements that create writings or markings and those hand movements that are not intended to and do not create writings or markings.

Further limitations and disadvantages of conventional and traditional approaches will become apparent to one of skill in the art through comparison of such systems with embodiments presented in the remainder of the present application with reference to the drawings.

SUMMARY OF THE INVENTION

Aspects of the present invention may be found in a method of text character recognition for a spatial chirographic reading device. The method may comprise tracking a path of a stylus tip in a writing volume. The method may also comprise converting the path of the stylus tip in the writing volume into a plurality inferred rotations. The method may also comprise generating a geometric configuration for the stylus tip path in the writing volume.

The method may also comprise employing the geometric configuration of the stylus tip path to facilitate spatial recognition of text characters. The method may also comprise recording a plurality of reference paths for a plurality of characters of a writing system. The method may also comprise identifying particular stylus paths related to particular characters being written and recognizing the particular characters being written. The method may also comprise a rotation being one of positive and negative with a chirographic text character reader device as a user performs handwriting actions with a stylus.

In an embodiment according to the present invention, the method may further comprise calibrating a font coordinate system. The method may also comprise partitioning the writing volume by an ink depth. The method may also comprise associating partitions of the writing volume with projections. The method may also comprise enclosing the writing volume within at least two projection spheres.

The method may also comprise deriving the plurality of inferred rotations for an inverse projection ray rotation upon an enclosing sphere. The method may also comprise defining a cardinal attitude reference sphere for the inferred rotations and graduating principal orthogonal rotational paths.

In an embodiment according to the present invention, calibrating the font coordinate system may further comprise assigning a font face area to a writing surface of the writing volume. The writing surface may contain a plurality of writing symbols in the writing system within the font face area. The method may also comprise affixing a font origin at one of a center of the writing surface and a position situated at least a distance below the writing surface.

The method may also comprise projecting a ray from the affixed font origin to the stylus tip to a point situated above a typeface plane. The method may also comprise locating a projection plane above the writing surface. The method may also comprise separating the projection plane from the writing surface by a small radial ink depth distance along a cone generator. The method may also comprise using the writing surface as a guide parallel to an X-Y projection plane.

The method may also comprise restricting the path of the stylus tip below an ink depth with the writing surface. The method may also comprise assigning a direction of one edge of the writing surface to a Cartesian X-axis. The method may also comprise assigning another direction of another edge of the writing surface to a Cartesian Y-axis and assigning a ray direction of another conical ray from the font origin through a middle of the typeface plane to a Cartesian Z-axis.

In an embodiment according to the present invention, partitioning the writing volume by the ink depth may further comprise associating a location above the ink depth of the stylus tip with a positioning handwriting stroke and associating another location within the ink depth of a stylus tip with an inking handwriting stroke.

In an embodiment according to the present invention, associating the partitions of the writing volume with projections may further comprise associating a stylus tip location in positioning depths with a first stereographic projection having rays from a first projection pole at the font origin through the stylus tip location to a point on a projection sphere above the writing volume and associating another stylus tip location in inking depths with a second stereographic projection having rays from a second projection pole located above the writing volume through the another stylus tip location to another point on a second spherical surface below the projection plane and equal in distance as the first projection pole from the projection plane to the font origin and being opposite in direction.

In an embodiment according to the present invention, enclosing the writing volume within at least two projection spheres may further comprise joining the at least two projection spheres wherein the at least two projection spheres intersect at the typeface plane forming a projection disc volume and sizing the at least two projection spheres wherein the writing volume is formed and contained within the projection disc volume.

In an embodiment according to the present invention, deriving the inferred rotation of the inverse projection ray rotation upon an enclosing sphere may further comprise converting stylus tip motions within a semi-disc into inferred rotation paths traced upon semi-disc surfaces by a projection ray associated with the stylus tip.

The method may also comprise converting stylus tip motions crossing an intersection plane at an intersection boundary circle into inferred rotations along meridian great circles and converting stylus tip motions crossing the intersection plane at points other than the intersection boundary circle into inversions between the at least two projection hemispheres.

In an embodiment according to the present invention, defining the cardinal attitude reference sphere for the inferred rotations may further comprise choosing a cardinal center of the writing volume for the inferred rotations. The method may also comprise enclosing an attitude sphere about the cardinal center, wherein the cardinal center contacts corners of the typeface plane and obtaining a cardinal direction from an attitude ray emanating from the chosen cardinal center to three rectilinear orthogonal axes of the writing volume.

In an embodiment according to the present invention, graduating the principal orthogonal rotational paths may further comprise assigning origin to a center of an attitude sphere. The method may also comprise assigning unity to one radial position from the center in positive orthogonal axes using radial torsion and adding a unit of rotation for each $\pi/2$ radian clockwise rotation of a unit radial position around the unit radial position axis of rotation.

In an embodiment according to the present invention, employing the geometric configuration to facilitate spatial recognition of text characters may further comprise labeling end points of the path of the stylus tip with a minimum number of reference rotational paths. The method may also comprise limiting the number of reference rotational paths employed. The method may also comprise partitioning a typeface plane into multiple segments and connecting reference end-points with interpolation ligatures.

In an embodiment according to the present invention, labeling the end points of the path of the stylus tip with a minimum number of reference rotational paths may further comprise selecting rotations about a center of the writing volume having orthogonal axes corresponding to principal orthogonal X, Y and Z axes, by one of path-connecting rotations with common path intersection points, path-connecting rotations with positioning path segments along a rotational orbit, path-connecting rotations with inversion from a positioning end-point to an initial point of an inking path at a typeface location.

The method may also comprise selecting a radius of curvature for an osculating sphere for minimal rotation paths, wherein path connecting end-points lie on a sphere. The method may also comprise providing a non-minimal number of additional representations of rotation paths by partitioning the typeface plane into segments, eliminating ambiguity of path labels, and simplifying path labels in segmented partitions.

In an embodiment according to the present invention, limiting the number of reference rotational paths employed may further comprise limiting the number of reference rotational paths employed to a minimum number to uniquely identify inking strokes for characters belonging a particular writing system, wherein a full stroke is rendered observable as a $\pi$ radian rotation of an osculating circle on an inferred rotation sphere, the full stroke adapted to extend beyond a typeface dimension, the full stroke being fitted into a partition of the typeface plane and being scaled to render the full stroke observable as a $\pi$ radian rotation.

In an embodiment according to the present invention, partitioning the typeface plane into multiple segments may further comprise providing added segments each having a set of three principal orthogonal axes supporting a plurality of orthogonal rotational paths of the writing system images. The method may also comprise ensuring that each partition reflects a distinct translation of origin, scaling of radius of curvature, and rotation of orientation of the set of three principal orthogonal axes.

The method may also comprise graduating the set of three principal orthogonal axes of each partition segment with one unit traversal of path segment in one quarter of a full rotation in each orthogonal axis about a center of curvature. The method may also comprise using a minimal number of partitions of a principal segment to provide a minimum number of additional path end-points for inking paths and limiting reference rotational paths employed in each partition segment to a minimum required by the writing system.

In an embodiment according to the present invention, connecting reference end-points with interpolation ligatures may further comprise extending path-connected segments to continuous connection between differing orbital rotations at common end-points by applying at a point of contact a finite inferred torsional impulse. The method may also comprise changing an orbital radius of curvature from that of a first orbital path to a second orbital path when connected orbit radii differ.

The method may also comprise changing an orbital center of rotation from that of the first orbital path to the second orbital path when the orbital paths have differing polar axes at the contact point. The method may also comprise changing an orientation of an orbital rotation plane from the first orbital path to the second orbital path when the orbital paths are non-coplanar at the contact point and connecting successive orbital paths between differing partitions when not point-connected by interpolating with a ligature path, wherein the ligature path effects the inferred torsional impulse.

In an embodiment according to the present invention, identifying particular stylus paths related to particular characters being written may further comprise identifying at least one straight line writing stroke and identifying at least one curved line writing stroke.

In an embodiment according to the present invention, identifying at least one straight line writing stroke may further comprise identifying the at least one straight line writing stroke through a center of a typeface plane. The method may also comprise identifying the at least one straight line writing stroke along an edge of the typeface plane.

The method may also comprise identifying the at least one straight line writing stroke not passing through one vertex of the typeface plane away from the center of the typeface plane and a mid-point of a typeface edge. The method may also comprise identifying the at least one straight line writing stroke connected to one point of the typeface edge away from the center of the typeface edge and identifying another straight line writing stroke disposed away from the typeface edge.

In an embodiment according to the present invention, identifying the at least one straight line writing stroke through a center of a typeface plane may further comprise identifying the at least one straight line writing stroke with a rotation around an inferred sphere of rotation along a great meridian circle through a Zenith pole on a positive Z-axis in a positioning directional attitude and through a Nadir pole on a negative Z-axis in inking directional attitude.

The method may also comprise identifying the at least one straight line writing stroke along a principal axis of the typeface plane. The method may also comprise identifying the at least one straight line writing stroke along a diagonal axis of the typeface plane and identifying the at least one straight line writing stroke disposed away from the principal axes and away from diagonals of the typeface plane.

In an embodiment according to the present invention, identifying the at least one straight line writing stroke along the principal axis of the typeface plane may further comprise identifying a span of the at least one straight line writing stroke along a principal axis of the typeface plane with one length from the center of the typeface plane to the mid-point of the typeface plane edge and identifying the rotation sphere of one length radius for the span of the at least one straight line writing stroke through the center of the typeface plane along the principal axis of the typeface plane.

In an embodiment according to the present invention, identifying the at least one straight line writing stroke along a diagonal axis of the typeface plane may further comprise identifying a span of the at least one straight line writing stroke through the center of the typeface plane along a diagonal axis to a vertex of the typeface plane using a Pythagorean hypotenuse defined by a right triangle completed with one length of a right principal axis side from the center of the typeface plane to the mid-point of typeface plane edge and another side from the mid-point of typeface plane edge along the typeface plane edge to the vertex connecting the typeface plane edge to the diagonal axis.

The method may also comprise identifying a rotation sphere of radius scaled by a modulus of the Pythagorean hypotenuse defined by the right triangle for the span of the at least one straight line writing stroke through the center of the typeface plane along a diagonal axis of the typeface plane from the center of the typeface plane to the vertex of the typeface plane.

The method may also comprise identifying a rotation sphere of unit radius scaled by a modulus $|2^{1/2}|$ of the Pythagorean hypotenuse defined by a unit right triangle for a unit span of the at least one straight line writing stroke through a center of a unit square typeface plane along a diagonal axis of the typeface plane from the center of the typeface plane to the vertex of the typeface plane.

In an embodiment according top the present invention, identifying the at least one straight line writing stroke away from the principal axes and away from diagonals of the typeface plane may further comprise identifying the at least one straight line writing stroke with a rotation around a meridian great circle of an angularly nearer principal axis to the meridian great circle at an inclination of the at least one straight line.

The method may also comprise identifying an angle of inclination between the at least one straight line and the angularly nearer principal axis. The method may also comprise identifying a rational number scaling of sides of the typeface plane according to a ratio determined by a trigonometric tangent of an angle between the angularly closer principal axis and an inclined at least one straight line writing stroke. The method may also comprise identifying a sign of a rational number scale to be positive when an inclination of the meridian great circle is clockwise rotated from the angularly nearer principal axis. The method may also comprise identifying the sign of the rational number scale to be negative when the inclination of the meridian great circle is anti-clockwise rotated from the angularly nearer principal axis.

The method may also comprise identifying a unit span of the at least one straight line writing stroke through the center of the typeface plane away from the principal axis and away from diagonals of the typeface plane with one length from the center of the typeface plane to an intersection point of the typeface plane edge and the principal axis and identifying an absolute span of the at least one straight line writing stroke through the center of the typeface plane away from the principal axis and away from diagonals of the typeface plane with a radius of the great meridian circle of the at least one straight line writing stroke changed from a radius of an adjacent principal axis great circle by rotational number scaling of an inclination of the at least one straight line writing stroke as a proportion of the rotational number scaling for rotation of an adjacent principal axis to the diagonal of the typeface plane.

In an embodiment according to the present invention, identifying at least one straight line writing stroke along an edge of the typeface plane may further comprise identifying the at least one straight line writing stroke along edges of the typeface plane with a parallel principal axis. The method may also comprise associating a rotation of a great circle along the parallel principal axis with a parallel rotation of a minor circle at the typeface edge.

The method may also comprise fixing a constant value to a perpendicular translation distance from a parallel principal axis great circle typeface center to the minor circle at the typeface edge and identifying a span of the at least one straight line writing stroke along the edges of the typeface plane with a diameter of a minor parallel circle at a line of a rotation sphere through typeface vertices.

In an embodiment according to the present invention, identifying the at least one straight line writing stroke away from the center of the typeface plane passing through one of a vertex of the typeface plane and a mid-point of the typeface plane edge may further comprise associating the at least one straight line writing stroke with a minor circle of an inferred rotation sphere and with a major circle of the inferred rotation sphere lying parallel to the at least one straight line writing stroke and translated from the center of the typeface plane by an offset from the center of the typeface plane to a minor circle center of curvature.

The method may also comprise associating the minor circle of the inferred rotation sphere with an inferred latitude angle made by a radial line from a point on the minor circle of the inferred rotation sphere to a center of the inferred rotation sphere and a plane of a parallel great circle. The method may also comprise identifying a span of the at least one straight line writing stroke with an upward scaling of a radius of the great circle wherein the minor circle connects to at least one edge of the typeface plane. The method may also comprise associating the span and offset of the at least one straight line writing stroke with a segmentation of the typeface plane fitting an edge and a quadrant of a path-connected edge of the typeface plane.

In an embodiment according to the present invention, identifying the at least one straight line writing stroke with a minor circle may further comprise associating with the at least one straight line writing stroke with a minor circle end-points falling within the typeface plane. The method may also comprise associating the at least one straight line writing stroke with a minor circle of the inferred rotation sphere.

The method may also comprise associating the at least one straight line writing stroke with a minor circle of the inferred rotation sphere lying parallel to the at least one straight line writing stroke being translated from the center of the typeface plane by an offset to a center of curvature. The method may also comprise associating the minor circle with an inferred latitude angle made by a radial line from a point on the minor circle to a center of the inferred rotation sphere and the plane of a parallel great circle.

The method may also comprise identifying a span of the at least one straight line writing stroke with a minor circle with a downward scaling of a radius of the parallel great circle such that the minor circle connects to two points of inversion lying within the typeface plane. The method may also comprise associating a rotational translation of $\pi$ radians in a traversal of a path between the two inversion points at end-points of the at least one straight line writing stroke. The method may also comprise associating the span and offset of the at least one straight line writing stroke with a segmentation of the typeface plane situated within the typeface plane and centered at a midpoint of the at least one straight line writing stroke.

In an embodiment according to the present invention, identifying curved line writing strokes may further comprise identifying circular line writing strokes. The method may also comprise identifying conic section line writing strokes and identifying cursive line writing strokes.

In an embodiment according to the present invention, identifying circular line writing strokes may further comprise detecting a curvature in the X-Y plane with four successive stylus tip position readings and maintaining a constant curvature for a significant number of subsequent position readings. The method may also comprise determining a center of a circle with a selection of three non-collinear points from a set of constant curvature position readings.

The method may also comprise identifying the circular line writing stroke via rotation of the inferred rotation sphere in the typeface plane around an orthogonal Z-axis. The method may also comprise identifying a maximal circular line writing stroke with a great circle of the inferred rotation sphere perpendicular to an axis line connecting the Zenith and the Nadir.

The method may also comprise identifying smaller central circles via parallel translation of an equatorial circle parameterized by parallel latitude. The method may also comprise identifying circles away from the center of the typeface plane with circles parallel to the equatorial circle and having an offset translation of orthogonal axes from a center of the principal axes.

In an embodiment according to the present invention, identifying conic section line writing strokes may further comprise detecting at least three non-collinear stylus position readings within one elliptical path in the X-Y plane to solve for quadratic equation coefficients corresponding to writing system conic shapes used.

The method may also comprise associating the inferred rotation sphere with an ellipsoid of handwritten writing stroke paths. The method may also comprise identifying conic shapes corresponding to circular shapes of the inferred rotation sphere after performing a change of coordinates.

In an embodiment according to the present invention, identifying general conic shapes corresponding to circular shapes of the inferred rotation sphere after performing a change of coordinates may further comprise scaling a first principal axis of the typeface plane with a major axis of the ellipsoid. The method may also comprise scaling a second principal axis of the typeface plane with a minor axis of the ellipsoid.

The method may also comprise rotating the first and second scaled principal axes to coincide with an orientation of major and minor axes of the ellipsoid and translating the first and second rotated and scaled principal axes so that rotation planes of a transformed inferred rotation sphere coincide with ellipsoidal handwritten writing strokes.

In an embodiment according to the present invention, identifying cursive line writing strokes may further comprise identifying cursive lettering corresponding to multiple conic section configurations. The method may also comprise identifying for each offset scaled and rotated set of orthogonal axes used to convert conic paths into circular and straight line projections and connecting end-points with spiral interpolation ligature paths.

In an embodiment according to the present invention, employing a spatial chirographic reading device to collect spatial data for identifying stylus paths for a character may further comprise enumerating all valid inking strokes of a writing system into consistent cardinal point paths.

The method may also comprise translating on-line data points into rotational paths for inking and positioning. The method may also comprise effecting recognition of a character by comparing a inking path traced by a stylus tip projection ray with reference character inking paths. The method may also comprise setting an initial path starting point to a zero torsion and a zero radius at a center of the writing volume and determining a plurality of handwriting strokes.

In an embodiment according to the present invention, determining a plurality of handwriting strokes may further comprise associating an initial identification reference position with an initial unit radial-action torsion impulse along a principal Z-axis from the center of the writing volume in a direction to assert one of a positioning in a positive Z-direction and an inking in a negative Z-direction.

The method may also comprise associating a first stylus position with a displacement in the X-Y plane of a unit Z-impulse vector from the center of the typeface plane to a first stylus X-Y position. The method may also comprise associating the initial identification reference position for a lettering path with a displacement of a unit Z impulse vector from the center of the typeface plane to the first stylus position. The method may also comprise associating a second position of the lettering path with a twist-action torsion impulse on the unit Z-impulse vector in a plane orthogonal to a principal X-Y plane to assert a first direction for the stylus tip path in a first osculating plane.

The method may also comprise associating a rotational path of a first path segment with a rotation vector having an X-rotation axis and Y-rotation principal axis components corresponding to twist-action torsion impulse components. The method may also comprise translating, scaling, and rotating the stylus first position along principal axes X, Y, and Z to partition segment axes X', Y', and Z' aligned as principal axes for cursive lettering and determining an inferred current rotational orbit.

In an embodiment according to the present invention, determining the inferred current rotational orbit may further comprise identifying an effective stroke length by detecting inversions from one of into and out of ink at ends of a path segment. The method may also comprise applying a third order contact between an inferred rotational orbit and the inferred rotation sphere to calculate a radial action torsion element of the stylus path.

The method may also comprise adjusting a radial action torsion impulse to fit a radius of the inferred rotation sphere for a path segment so that a full-stroke projects a diameter of a stylus path osculating circle to fit a length of an effective length stroke projection. The method may also comprise recording an inferred center of curvature identified by a derived osculating circle. The method may also comprise recording an end-point for an inferred rotational curve and tracking rotation along the inferred rotational orbit.

In an embodiment according to the present invention, tracking rotation along the inferred rotational orbit may further comprise recording an inferred twist action torsional translation of a center of curvature from a previous center of a rotation sphere to a center of curvature of a current path segment. The method may also comprise recording an inferred radial torsional component impulse used to establish the inferred rotation orbit.

The method may also comprise verifying a stylus tip locus along the inferred rotation orbit. The method may also comprise incrementing a number of half-strokes as each end-point is traversed. The method may also comprise detecting a change of path from a current orbit. The method may also comprise recording the number of half-strokes traversed along a current inferred orbital path and stopping the incrementing of half-strokes upon detecting a change of path from the current orbit.

In an embodiment according to the present invention, determining a handwritten writing stroke by detecting a change of path from the current orbit and connecting end-points with spiral interpolation ligature paths may further comprise detecting a twist action torsion component distinct from a recorded twist action torsion component.

The method may also comprise substituting a detected twist action torsion component for an initial torsion component. The method may also comprise determining an inferred rotational orbit the substituted twist action torsion component and tracking rotation along the inferred rotational orbit.

In an embodiment according to the present invention, determining the handwritten writing strokes may further comprise determining termination of handwriting of a written character by returning the stylus to a home position and ceasing recording significant stylus motion. The method may also comprise translating, scaling and rotating axes X', Y', and Z' back to principal orthogonal axes X, Y, and Z for cursive lettering when determining the handwritten writing strokes entailed a transformation of the principal orthogonal axes X, Y, and Z to those of cursive partition segments of the typeface plane.

In an embodiment according to the present invention, recording reference paths for all allowable characters in the writing system may further comprise tabulating resulting path recordings for all valid characters of the writing system. The method may also comprise storing the resulting path recordings as reference paths for use in recognition of handwritten characters and retrieving the tabulated resulting path recordings for use in recognizing handwritten text by use of the spatial chirographic reading device.

In an embodiment according to the present invention, employing a spatial chirographic reading device to recognize characters being handwritten with a stylus of the chirographic reading device may further comprise collecting handwritten writing strokes associated with a plurality of stylus paths. The method may also comprise recording the handwritten writing strokes associated with a plurality of stylus paths.

The method may also comprise comparing inking paths traversed by the stylus starting from a first handwritten writing stroke to a last handwritten writing stroke to reference paths tabulated for each character in the writing system. The method may also comprise recognizing a text character when an inking portion of a handwritten writing strokes associated with a stylus path matches inking portions of a text character stored in a tabulated reference list of text characters.

These and other advantages and novel features of the present invention, as well as details of an illustrated embodiment thereof, will be more fully understood from the following description and drawings.

DETAILED DESCRIPTION OF THE INVENTION

Figure 1:
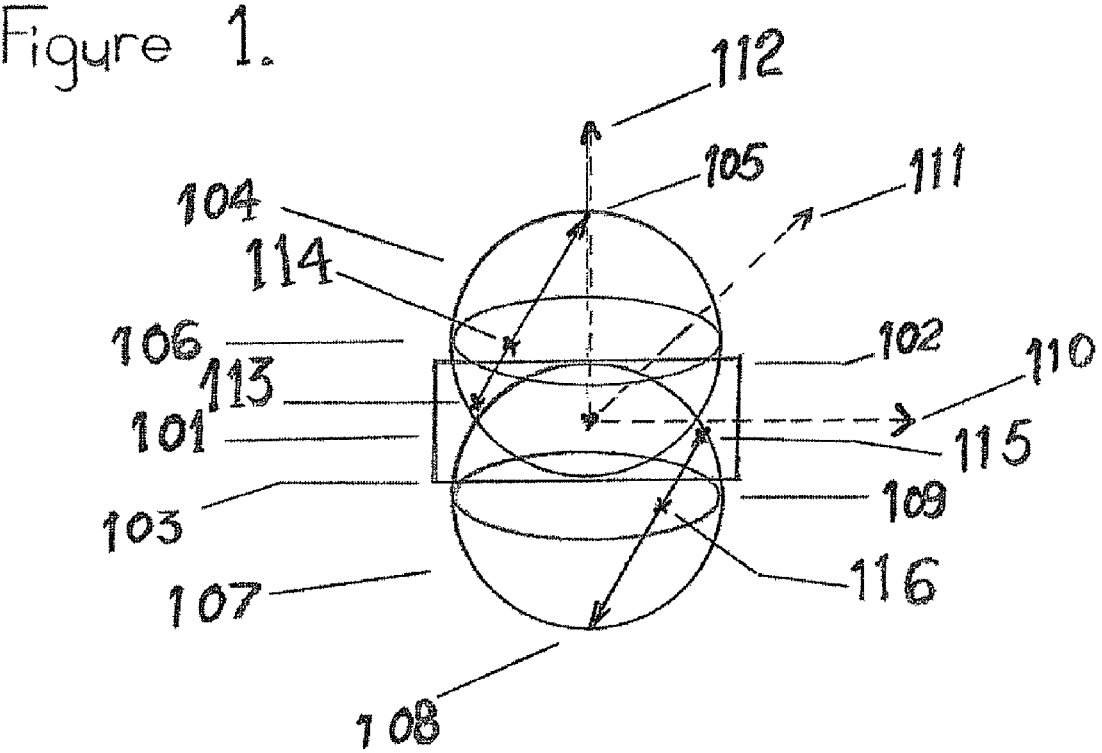
FIG. 1 is a vertical cross-sectional view of two superimposed stereographic projections in a writing volume according to an embodiment of the present invention.

Aspects of the present invention may be found in implementing a spatial chirographic text character recognition method by turning a writing volume into discrete typographic regions within which a path segment of a handwriting stroke may be invariantly identified to have traversed regardless of size of the stroke or its distance from the center of the writing volume.

Depending upon the writing system being used, a finite minimum number of regions may uniquely identify distinct characters, and define in a discrete fashion, directions and the potential end-points of path segments within the regions. The writing volume may be partitioned between inking and positioning and all inking path segments may be collected and gathered for each character of the writing system for later reference during recognition.

Aspect of the present invention may also be found in a character recognition process, wherein identification of a locus of a stylus tip through a discrete path segment region may be made. By convention, beginning the identification process may comprise arbitrarily beginning at a cardinal zenith out-of-ink direction and may also comprise ending at the zenith out-of-ink direction.

As inscription proceeds, various in-ink path segments may be identified regardless of direction of traversal. These in-ink path segments may be used to identify candidate characters determined from a set of collected reference path segments containing the traversed in-ink path segment. As more inking paths are traversed, the candidate reference characters may diminish until at least one remains. Therefore, over a course of writing a handwritten character, from beginning to end, candidate characters initially comprising an entire alphabet or character set, are reduced to at least one character actually being written. The character may then be identified.

The method may operate on-line so that character recognition and identification may be effected immediately as a qualifying path segment is identified. To support the immediacy of the technique, identification may proceed in a sequence favoring rapid identification.

For the Latin block capital letters, for example, character recognition may comprise identifying paths along principal axes, along the typeface edges, along diagonals, along other lines bisecting the typeface, and along any of the forgoing paths offset from the typeface origin. Any of the foregoing straight lines that do not span the full typeface dimension may be scaled up or down to be made to conform to an entire span.

A similar character recognition sequence may be used for circular paths, large circles, and small circles, for example, for Latin block capital letters comprising curved lines. Standardized offsets for a top and bottom half of the typeface may be employed in identifying circles of half typeface scale. Other scaling, (including rotation and offset), may be performed for italicized letters.

Similarly, scaling may also be combined with segmentation forming tiled segments used to identify cursive Latin letters. Alternatively, a combination of tiled segments and contained segments of the principal typeface may also be used to identify characters of other writing and character systems, such as for example, Cyrillic, Tamil, Chinese, Japanese, and Korean, glyphs, and hieroglyphics. The limit-point identification may be made within a few time sequenced readings from a spatial chirographic stylus reader to effect real-time on-line recognition.

The present invention may comprise an on-line technique for recognizing handwriting character symbols. When rendered as stylus path data by a spatial chirographic sign reader, handwriting character symbol paths may be converted into discrete rotations by a geometrical configuration of a writing volume.

A chirographic reader may be enabled to produce real-time spatial data from handwriting strokes of a stylus held by a writer against the device.

In an embodiment according to the present invention, spatial data may be in the form of spherical coordinates in a three-dimensional spatial volume above a writing surface. The spatial data may be used to identify handwriting signs with corresponding font coordinates. The corresponding font coordinates may be used to associate points in the writing volume with points on the writing surface by projection from a projective origin. The origin may be located below the writing surface such that a projective cone may span the writing surface and projective lines may span the writing volume. The origin of the font coordinates may therefore be located below the writing surface.

The writing surface may coincide with an X-Y projective plane, and spatial data points that project into handwriting marks may be viewed as pre-images of a projected handwriting sign on the writing surface.

The stylus does not actually make any marks, that is, it does not write upon the writing surface. Rather, the writing surface of the chirographic reader may serve as a guide to an imaginary planar area upon which an image of writing mark may be projected. The X-Y projection plane may be identified with a typeface, and may accordingly associate X-Y coordinates with typeface coordinates. The typeface may be a rectangular area within which a written image, sign, or mark may be directed. A center of the rectangular area may be the origin of the typeface coordinates, and in a right-handed coordinate system, the X-axis may follow a horizontal direction to the right, and the Y-axis may follow a vertical direction extending from the origin.

Pre-image data may be points disposed in a volume above the typeface, and spatial rectangular coordinates may be achieved by setting a Z-axis pointing outwardly and upwardly from the typeface at the origin and applying a change of coordinates from measurement spherical coordinates. The writing volume may be generated by the typeface and by the typeface linear offset along the Z-axis.

In an embodiment according to the present invention, the chirographic reader may identify a pre-image with a handwriting sign by restricting the spatial data to only that portion of spatial points causing a marking of a handwriting sign when projected upon the writing surface, and excluding spatial data that do not cause a marking of a handwriting sign when projected upon the writing surface.

The chirographic reader is adapted to provide identification of handwriting facsimile images projected upon the writing surface and extend facsimile identification ability of the chirographic reader into a capability of achieving in-line recognition of a character matching a symbol image acquired from the chirographic reader.

Aspects of the present invention may be found in a method of rapidly categorizing handwriting signs made in real-time and identifying the handwriting signs in rapid succession. Because the writing volume is spanned by a projection cone, the chirographic reader may be adapted to reduce spatial points into conic sections. There is a computational cost associated with finding X-Y coordinates of conic end-points of image segments, such as, the cost of affine translation techniques.

Whereas methods of the prior art may be adapted to determine handwriting signs that may vary within and between individual writers by using statistical identification of parameters of stochastic models in accordance with a Markov model, the method according to the present invention does not begin with 2D data to which stochastic filtering of affinely translated X-Y handwriting traces is made.

Rather, the present invention may be adapted to use 3D data and reduce X-Y-Z handwriting traces to the locus of the unit-speed indicatrix vector, which by the Fundamental Theorem for Curves in $R^3$, eliminates all individual peculiarities and leaves behind paths that are topologically distinct up to orientation (rotation and translation) when curvature and torsion are continuous, and curvature is positive (which conditions are satisfied in handwriting motions centered around a typeface origin).

By focusing on matching of X-Y shapes and by ignoring geometry, the chirographic reader may be adapted acquire spatial data by capturing fly-over stylus positioning strokes, thus adding reliability information that may be incorporated into a matching process.

In order to categorize spatial curves, a discretization method may be adopted. The method may comprise forming spherical vectors, i.e., vectors on spherical surfaces, and considering translations of the spherical vectors to be rotations. There may be a variety of representations of rotations all with different advantages. A few of the representations are given here to distinguish a choice of a preferred discretization. In an embodiment according to the present invention, a geometric discretization method may also be incorporated into a handwriting recognition process.

Representation of Rotations

Aspects of the present invention may be found in a representation of rotations, wherein the vector spaces arising from the rotations and discretization thereof by eigenvalues may be used as motivation for discretization of the writing volume.

Euler Angles: A configuration space denoted by the triple unit vectors (i, j, k) may be transformed by rotations relative to fixed space vectors (x, y, z). An arbitrary rotation may be indicated by Euler angles ($\alpha$, $\beta$, $\gamma$) illustrated in the following sequence:

1. Rotation of $\gamma$ about the z axis, namely $R(\gamma z)$;
2. Rotation of $\beta$ about the y axis, namely $R(\beta y)$; and
3. Rotation of $\alpha$ about the z axis, namely $R(\alpha z)$.

The composite $R(\alpha\beta\gamma) = R(\alpha z)R(\beta y)R(\gamma z)$ is made unique by restricting the range on $\beta$ to $0 < \beta < \Pi$. The operations do not commute. Once the Euler angles are given, the transformations are given by the following matrix expressions:

$$R(\alpha z) = \begin{bmatrix} \cos(\alpha), & -\sin(\alpha), & 0 \\ \sin(\alpha), & \cos(\alpha), & 0 \\ 0, & 0, & 1 \end{bmatrix}$$

$$R(\beta y) = \begin{bmatrix} \cos(\beta), & 0, & \sin(\beta) \\ 0, & 1, & 0 \\ -\sin(\beta), & 0, & \cos(\beta) \end{bmatrix}$$

$$R(\gamma z) = \begin{bmatrix} \cos(\gamma), & -\sin(\gamma), & 0 \\ \sin(\gamma), & \cos(\gamma), & 0 \\ 0, & 0, & 1 \end{bmatrix}$$

and the composite rotation is obtained by matrix multiplication. A proper rotation has determinant +1.

Given a rotation matrix $A = [A_{ij}]$, the rotation angle $\phi$ is derived from:

$$\cos\phi = (A_{11} + A_{22} + A_{33} - 1)/2,$$

and the rotation axis n is given by components:

$$n_i = (A_{i+2,i+1} - A_{i+1,i+2})/2\sin\phi,$$

as i cycles through the indices 1, 2, 3, and back to 1.

The converse may also be performed; that is, given n and $\phi$, $A = [A_{ij}]$ may be derived by defining $n = (n_x, n_y, n_z)$ to express the skew-symmetric matrix:

$$Z_n = \begin{bmatrix} 0, & -n_z, & n_y \\ n_z, & 0, & -n_x \\ -n_y, & n_x, & 0 \end{bmatrix}$$

Using 1, for the identity matrix of the same dimensions, the rotation matrix A is obtained from the radial rotation expression:

$$A = R(\phi n) = 1 + \sin(\phi)Z_n + 2\sin^2(\phi/2)Z_n^2.$$

Conical Transformation: Given the standard representation of a rotation, namely $\phi n$, the rotation of any vector r around n is given by:

$$R(\phi n)r = r + \sin(\phi)n \times r + 2\sin^2(\phi/2)n \times n \times r.$$

Quaternion Parameterization: Given the standard representation of a rotation $-\phi n$, a unique pair $(\lambda, \Lambda) = (\cos(\phi/2), \sin(\phi/2)n)$ with a multiplication rule:

$$[\lambda_i, \Lambda_i][\lambda_j, \Lambda_j] = [\lambda_i \lambda_j, \lambda_i \Lambda_j + \lambda_j \Lambda_i + \Lambda_i \times \Lambda_j]$$

defines quaternion representations of rotations that are unique up to sign.

Orthogonal Axes: Rotations can also be measured about orthogonal axes by the angles ($\xi$, $\eta$, $\zeta$) around (x, y, z) respectively and denoted $X(\xi)$, $Y(\eta)$, and $Z(\zeta)$, and given by the following matrices:

$$X(\xi) = \begin{bmatrix} 1, & 0, & 0 \\ 0, & \cos(\xi), & -\sin(\xi) \\ 0, & \sin(\xi), & \cos(\xi) \end{bmatrix}$$

$$Y(\eta) = \begin{bmatrix} \cos(\eta), & 0, & \sin(\eta) \\ 0, & 1, & 0 \\ -\sin(\eta), & 0, & \cos(\eta) \end{bmatrix}$$

$$Z(\zeta) = \begin{bmatrix} \cos(\zeta), & -\sin(\zeta), & 0 \\ \sin(\zeta), & \cos(\zeta), & 0 \\ 0, & 0, & 1 \end{bmatrix}$$

Stereographic Projection: Rotations cause movement of a point on a unit sphere. If such a point is denoted (x, y, z), the point's spherical projection from a pole at say Z=+1, onto the point (X, Y) on plane X-Y parameterized by x=(1−z)X and y=(1−z)Y in the lower hemisphere, may be replaced by the complex parameterization U=X−iY of u=x−iy where u=(1−z)U. For complex point U, which transforms bilinearly as:

$$U' = (B_{11}U + B_{12})/(B_{21}U + B_{22}),$$

where B is the 2×2, matrix $[B_{11}, B_{12}, B_{21}, B_{22}]$.

Homogeneous Coordinates: The above spherical coordinates (u, z) relate to homogeneous coordinates $\mu = [\mu_1, \mu_2]$ defined such that $U = \mu_1/\mu_2$, which transforms linearly as:

$$\mu' = T\mu, \text{ where matrix } T = [a, b, -b^*, c^*].$$

The bilinear transform B of a complex variable converts into a linear transform T of complex coefficients a, b and c, over the homogeneous coordinates of stereographic projection point μ, normalized to unity ($\mu_1\mu_1^*+\mu_2\mu_2^*=1$), so the sphere coordinates (u, z) are found to be $u=2\mu_1\mu_2^*$ and $z=\mu_1\mu_2^*+\mu_2\mu_1^{*'}$ and $\mu_1, \mu_2$, is a projection ray parameterized on depth 1−z, from the projection pole.

Angular Momentum Spinors: The 3×3, skew-symmetric matrix $Z_n$ mentioned above suggests a decomposition into independent 2×2, matrices, and under infinitesimal rotations of matrices in the commutative orthogonal axis representation, a basis exists such that angular dynamics may be well defined. Rotations are then represented by the Special Orthogonal (SO) group 3 (SO(3)), whose basis elements are the Pauli angular momentum matrices $\sigma=(\sigma_x, \sigma_y, \sigma_z)$, and the identity matrix $\sigma_0,=1$:

$$\sigma_0, \begin{bmatrix} 1 & 0 \\ 0 & 1 \end{bmatrix}$$

$$\sigma_x \begin{bmatrix} 0 & -1 \\ 1 & 0 \end{bmatrix}$$

$$\sigma_y \begin{bmatrix} 0 & -i \\ i & 0 \end{bmatrix}$$

$$\sigma_z \begin{bmatrix} 1 & 0 \\ 0 & -1 \end{bmatrix}$$

The sign ambiguity of quaternion rotations may be eliminated by projection factors signifying the hemisphere of the spherical projection. For rotations considered thus far, one of the following projection factors i may apply:

Cartan gauge $$i \begin{bmatrix} -i & 0 \\ 0 & -i \end{bmatrix}$$

Pauli gauge $$i \begin{bmatrix} 1 & 0 \\ 0 & 1 \end{bmatrix}$$

The Pauli gauge handles proper rotations ([i, i]=+1), and the Cartan gauge additionally accounts for improper rotations or inversions ([i, i]=−1). In particular, the improper rotation or inversion through the origin causes a reversal of orientation of configuration axes at the origin, and a geodesic inversion takes a point on the sphere to its opposite point through the center. Whereas proper rotation momenta are denoted $\sigma_i$, their inversion counterparts may be denoted $\rho_i$.

The special orthogonal group SO(3) of three-dimensional rotations decomposes into the Special Unitary (SU) group 2 (SU(2)) two-dimensional rotations vectors called spinors, with bases:

$$(u_1, u_2) = (2^{-1/2} u_{1/2}, 2^{-1/2} u_{-1/2})$$

A spinor represents the smallest dimension of vector spaces and corresponds to angular momentum observables, wherein rotations may given by:

$$R(\phi n) = \exp((-\tfrac{1}{2})i\phi n\sigma),$$

and the right hand side equates to sinusoidal form:

$$R(\phi n) = \cos(\phi/2)1 - i\sin(-\phi/2)(n\sigma),$$

which expands to the 2×2, matrix $R(\phi n)$:

$$\begin{bmatrix} \cos(\phi/2) - in_z\sin(-\phi/2), & -(n_y + in_x)\sin(\phi/2) \\ (n_y - in_x)\sin(\phi/2), & \cos(\phi/2) + in_z\sin(-\phi/2) \end{bmatrix}$$

Cayley-Klien Parameterization: Spinors form the smallest building blocks of the Hermitian tensor hierarchy. The elements of the linear transformation T of stereographic homogeneous coordinates $\mu=[\mu_1, \mu_2]$ above are a special case of Cayley-Klien parameterization. In general, for rotation around the axis z, identify parameters a, b thus:

$$(a,b) = (\cos(\phi/2) - in_z\sin(\phi/2), -(n_y in_x)in(\phi/2)).$$

Then a rotation R(a, b), in terms of quaternion [λ, Λ], may be given by matrix:

$$R(\lambda\Lambda)\begin{bmatrix} a & b \\ -b^* & a^* \end{bmatrix}$$

where:

$$a=\lambda-I\Lambda_z, \ b=-\lambda-i\Lambda_x, \ a^*=\lambda+i\Lambda_z, \text{ and } b^*=-\lambda-i\Lambda_x.$$

For rotations in higher dimensions consider rotations with angular momentum I. The base $\mu_i$ may be extended j-fold times in contravariant index j (where i is a covariant index) by tensor products. The number of basis elements may be minimized by symmetrization to give the rotation matrix rank 2j+1, with element index j ranging from m=−j, . . . , 0, . . . +j. Each of the elements is an eigenfunction of angular momentum Z-axis component $I_z$, with eigenvalue m, where j is the quantum number corresponding to the eigenfunction. This effectively discretizes the angular mechanics of the higher-dimension rotation system.

Spherical Vectors: The spherical vector bases ($u_1, u_0, u_{-1}$) are the special case for j=½, and rank=3, for rotations in three dimensions. One may define spherical vectors with basis components:

$$(u_1, u_0, u_{-1}) = \{(1/\sqrt{2})(x-iy), -z, (-1/\sqrt{2})(x+iy)\}$$

that transform vectors (x, y, z) to 3, dimensional complex space. Rotations in this space correspond to their spherical projections such that:

$$R(\beta y)(-z) = \sin(\beta)u_1, +\cos(\beta)u_0, -\sin(\beta)u_{-1}$$

The projection pole is at z=+1, and the hemisphere of interest, opposite to the pole, has points that fall in the range of z<0 depth. The Cayley-Klien parameterization ensures that the basis vectors apply equally well to arbitrary rotation R(φn).

Discretizing the Writing Volume

The foregoing illustrates that discretization may be achieved by reducing the dynamics of a writing stylus into rotations by transforming the pre-image onto a reference unit sphere known as a Riemann sphere of a stereographic projection. The infinitesimal rotation condition may still be met by assigning only those pre-image points actually lying on the bottom hemisphere to an Inking projection, and assigning all other pre-image points to an opposite positioning projection.

The condition illustrated above may be achieved by applying two spherical stereographic projection systems on the writing volume as shown in FIG. 1. The first stereographic projection system having a projection pole in the negative z direction may be designated to project all positional movements of a stylus. The pole of the first sphere may be made to coincide with the origin of the font coordinate.

The second spherical stereographic projection may have a projection pole in the positive z direction and may be designated to pre-image points on the lower hemisphere of the second/reference sphere. This implies that the stylus may mark an image only if the stylus touches the bottom of the second/reference sphere.

Practical considerations, such as sensitivity of measurement of radial motions of the spatial chirographic reader may dictate that some finite minimal limit be used to indicate contact between the stylus tip and the inking surface of the first/positive reference sphere. The finite minimal limit may be referred to as the ink depth.

In an embodiment of the present invention, the two spherical stereographic projections may be combined into one by associating retraction of the stylus tip from the ink surface with an inversion within the first/positive projection, but although this would preserve rotation symmetries, there is no guarantee this would preserve a shape of a positioning trajectory, because distortion of distances may become visually intolerable for writing purposes. The two separate first/positive reference and second/negative reference spherical stereographic projections may be retained in the illustrated configuration to preserve visual recognition.

An advantage of creating projective redundancy, as illustrated above, may also ensure that a projection point at an end of an extension of the stylus (a final position of a positioning extension) onto the lower hemisphere (writing surface) coincides with the projection point of a beginning of a retraction (an initial positioning retraction) if retraction occurs at the same point.

For the redundant projective system, visual signs of any writing system may be categorized by coincident end-points of associated glyphs. Discretization may be accomplished morphologically by restricting and categorizing rotations into a minimal number of geodesic paths suggested by visual symmetries of handwriting system symbols according to an embodiment of the present invention.

Dynamics of the Stylus Tip Positioning

Attitude Dynamics: Discretization may be based upon a notion of infinitesimal rotations and may not always be appropriate when considering rotations in general. Representations, such as the Euler angle, may remain useful for measurement purposes, and those measurements may be transformed for other uses such as specifying dynamics of rigid body rotation using an angular equation of motion as follows:

$$(J\omega') + (\omega \times (J\omega)) = \delta u,$$

where J is an inertia matrix, $\omega$ an angular velocity vector, $\omega'$ the angular acceleration, and $\delta u$ the control actuator torque. The Euler angle measurements may provide the spatial attitude of the rigid body, but the quaternion representation may offer the advantage of eliminating singularities inherent to the Euler angles in calculations of a dynamical system. The quaternion $\lambda\Lambda$ with attitude norm constraint:

$$\lambda^2 + \Lambda^T\Lambda = 1,$$

where $\Lambda^T$ stands for the transpose of $\Lambda$, and adheres to the kinematic differential equation:

$$[\lambda\Lambda]' = [-\Lambda^T\Lambda/2, ((\omega\times\Lambda) + \lambda\omega)/2]$$

where the prime (') sign indicates a derivative with respect to time.

To utilize the above attitude dynamics, the stylus tip may be associated with a point on an attitude sphere centered at point C in a middle of the writing volume, and touching anti-poles of two Riemann spheres.

Orbital Dynamics

In an embodiment according to the present invention, a locus of the stylus tip (or attitude of the stylus tip with respect to a center of the writing volume) may be associated with an orbit of a point mass in a gravitational field centered in the writing volume.

In an embodiment according to the present invention, in order to maintain the continuity constraint, there may be a plurality of or multiple fixed points in the writing volume. The points may coincide with end-points of a morphological discretization described below. Together, the endpoints may form a composite of orbitals generated by a point matrix.

Under this rendering of the set of gravitational fields associated with the point matrix, the locus of the stylus tip may correspond to a free (geodesic) path of a point mass along any one of the orbits of the point matrix. The point mass may stay in one orbit of fixed curvature unless disturbed at an end-point by a rotational impulse containing torsion effects into another allowable orbit at the end-point. An impulse of angular momentum $\delta u$ at one fixed end-point may transfer the path of the point mass to a different orbit of constant curvature.

Impulse Path Operator

The above angular momentum impulses describe the positioning actions of a writer's hand upon the stylus, as tracked by the positioning projection. In this fashion, one may develop a discretized rotational dynamical system representation for the handwriting images of any cultural handwriting system. If each orbital represents a state of the stylus, then we can define an impulse $\delta\sigma$ similar to an attitude actuator impulse $\delta u$ causing a state transition between orbital paths. Because the elements $\delta\sigma = (\sigma_0, \sigma_x, \sigma_y, \sigma_z)$ of Pauli angular matrices $\sigma$ are linearly independent a unit orbital path operator $\sigma_i$ may be defined with index i=x, y, z, such that an action $+\sigma_0 + \sigma_i$ may cause an initial angular state $+\sigma_{0i}$ to undergo a rotation $+\sigma_{1/2\pi i}$ of magnitude $\phi + \pi/2$ in the clockwise direction when viewed from the positive axis i toward the origin, along the angular momentum component of $\sigma_i$, and scaled so that rotations of $\pi/2$, correspond to a magnitude of unity. The factor $+\sigma_{0i}$ may be associated with the initial state of $\sigma_i$ at $\phi_i = 0$. The zero of the angular scale may require that $+\sigma_{0i}$ point be an initial attitude at the unit sphere, the initial point on the sphere may be designated modulus 1, and the center of the sphere for all directions modulus 0. The following operator notation (shorthand) may be adopted for a change of state:

$$+\sigma_i = \int_{+\sigma_{0i}}^{+\sigma_{1/2\pi i}} (\sigma) d\phi_i$$

This operator may be a notational convenience for incorporating application of a momentum impulse upon a point mass at an initial state and tracing the resultant path by integration into a final state $\frac{1}{2}\pi$ removed from the initial state. An initial impulse generator $\delta\sigma_i$ may trigger movement of a point mass on the orbital, and the integral may incorporate an annihilating impulse stopping the movement of the point mass at an end of orbital path segment at angle ½π relative to the angle of the starting point. The area under the curve for this integration may be defined to be unity by convention so that the outcome of the integration starting with some angular state $\sigma_{0i}$ is the state $+\sigma_{1/2\pi i}$. A series of orbital path segments may be composed without having to make special arrangement for triggering or annihilation of impulses at each segment transition.

Another operator notation may be adopted for reflection across a projection plane using a change of state by inversion:

$$\rho_i = \int_{\rho_{0i}}^{\rho_{\pi i}} (\rho) d\phi_i$$

This operation describes translation between stereographic hemispheres parallel to the polar axis. The impulse generator δρ may behave just like the rotation impulse generator δσ, except that the action may be inversion, and may be defined as $\delta\rho = (\rho_0, \rho_x, \rho_y, \rho_z)$.

The point mass actions of the σ and ρ generators may be comparable to the atomic s and p orbitals respectively, with the difference that $\rho_i$ may be fashioned to accomplish parallel inversion across the hemispheres. To do so, $+\rho_i$ operator may be taken for a shorthand for movement of a point mass from the zenith Z through the center C of the Riemann sphere, and to the nadir O. Other points on the sphere may be inverted by translation parallel to the Zenith inversion.

Path Topology in Writing Volume

Figure 3:
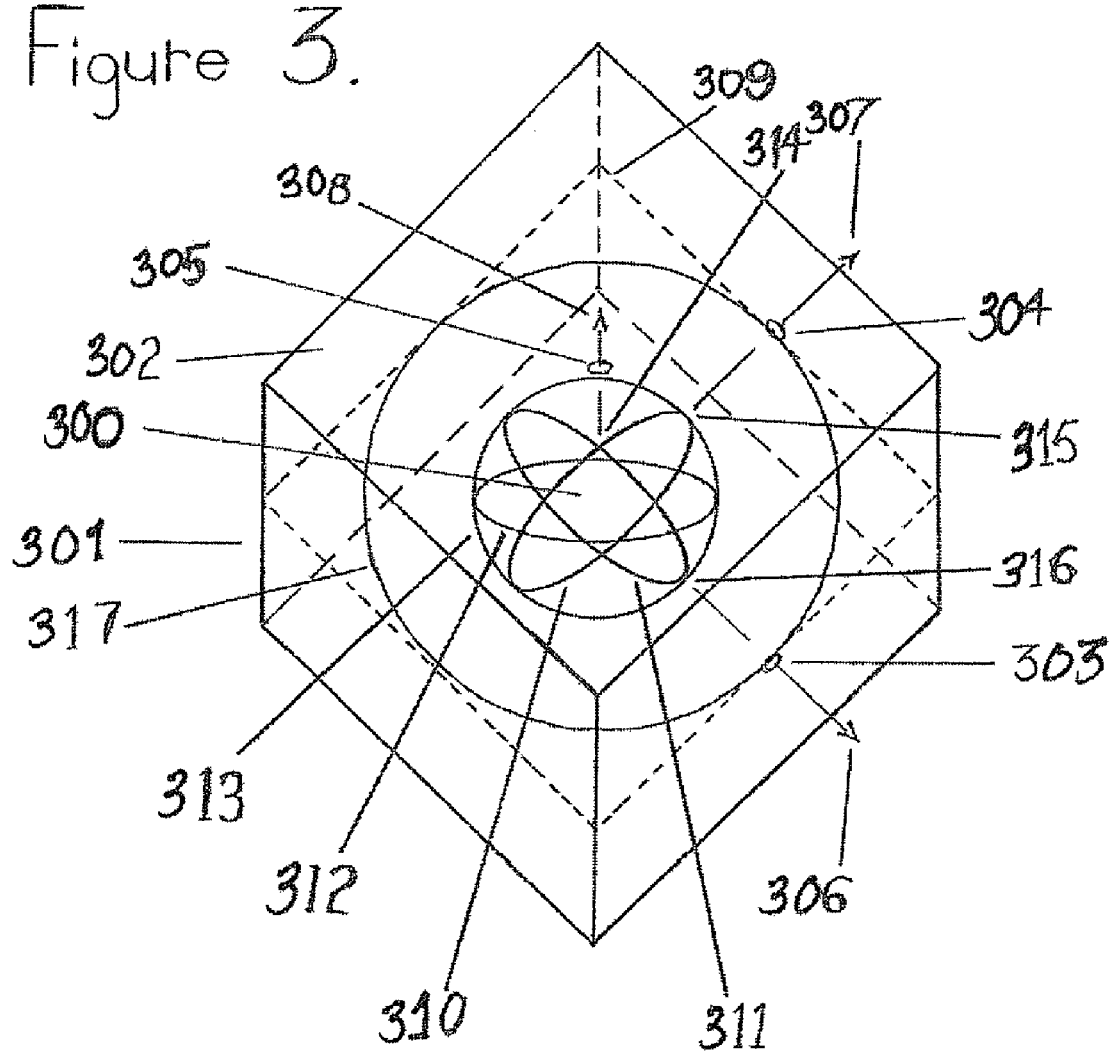
FIG. 3 is a wire-frame isometric perspective view of an attitude sphere illustrating three orthogonal rotation planes according to an embodiment of the present invention.

Given that the stylus may be tracked by orthogonal rotations, a topological construction named after Euler illustrates that any arbitrary pair of paths that share end-points in a topological ball may be topologically equivalent if interchanged by continuous deformation. Such equivalent classes may be called homotopies, and an object of the present invention is to identify and categorize stylus paths of any random handwriting to an equivalence class of standard writing symbols defined by a standard spatial rotational path. A reference attitude sphere may be used to define standard paths in a fixed coordinate frame as shown in FIG. 3.

End-Point Recognition

The end-points of standard orbital paths may be associated with specific impulses changing a dynamical state of a stylus point mass at the end-points. For a particular written character, the end-points may be dynamical limit points being topologically invariant, wherein the points may be detected and may persist under any smooth transformation of coordinates.

The points may be detected in the spatial coordinates as limit points. A linear state variable equivalent to the angular impulse is velocity (gradient in time), and in linear coordinates may be detected by identification in the writing volume of a reversal of the time gradient in the pre-image data.

If a chirographic reader generates at time t, a position reading $p_t$, each reading taking time to be gathered, the delay being referred to as a measurement relaxation time of t. The data acquisition system may collect the data at a rate of 1/t, known as a hardware sensor interrupt rate. An interrupt counter t may serve as an empirical time counter, wherein each raw measurement $p_t = p_{it}$, i=x, y, z, may be parameterized by time and the gradient, within an accuracy limit of a reader sensor, and may be given by a difference $\delta p_t = p_{t+1} - p_t$, and the gradient reversal may be detected in three interrupts by comparison of a difference in position readings $\delta p_t = \delta p_{t+1} - \delta p_t$. A topological recognition process may be capable of operating in real-time with a latency of t=3, for gradient, to an extent that the topology pre-defines invariantly the number and type of limit points to be expected for a symbolic lexicon, and to an extent that the sensors do not generate random reading errors. In the recognition technique according to an embodiment of the present invention, no stochastic processes, such as hidden Markov models with parameters to be estimated, are built-in.

Recognition of Circular Paths

Circular paths lying in the X-Y plane have the same rotational path $\sigma_z$, except for the radius and location of center of rotation C'.

Disclosed below is a discussion of the time parameterization of position readings in the XY plane $p_t = (x, y)$. The curvature κ of an arc traced by $p_t$ in the XY plane may be given by:

$$\kappa = \pm (x'y'' - y'x'')(x'^2 + y'^2)^{-3/2}$$

where (') and ('') represent the first and second derivatives with respect to time. Using the time measurements given before, a difference estimate of the second derivative may be obtained:

$$P''_t \approx \delta(\delta p_t)$$
$$= \delta(\delta p_{t+1}) - \delta(\delta p_t)$$
$$= p_{t+2} - p_{t+1}, -p_{t+1} + p_t$$
$$= p_{t+2} - 2p_{t+1} + p_t$$

and after substituting $$x_t' = x_{t+1} - x_t,$$
$$y_t' = y_{t+1} - y_t,$$
$$x_t'' = x_{t+2} - 2x_{t+1} + x_t \text{ and}$$
$$y_t'' = y_{t+2} - 2y_{t+1} + y_t,$$

the difference estimate of κ is:

$$\kappa_t = \pm(x_t'y_t'' - y_t'x_t'')(x_t'^2 + y_t'^2)^{-3/2}$$

with a latency of t=4, on each curvature estimate, and from which the radius of curvature $1/\kappa_t$ may be derived.

Alternative Search of Circular Paths

Given the locus of points p=(x, y) on circular arc with radius r=1/κ, and where (x, y) are subspace coordinates of points with constant z in (x, y, z) space, horizontal and vertical offsets of a center point Q=(h, v) may be derived from the general circle formula:

$$(x-h)^2 + (y-v)^2 - r^2 = 0.$$

This is a special form of the quadratic equation, $$ax^2 + ay^2 + dx + ey + f = 0,$$

whose center and radius may be determined by completion of squares to obtain a previous general circle formula by dividing by a, so long as a≠0 and adding $(d/2a)^2$ and $(e/2a)^2$ to complete the squares and get, $$r^2 = -f/a + (d/2a)^2 + e/2a)^2$$

$$Q = (-d/2a, -e/2a).$$

The center of the circular arc may be determined by deriving the quadratic equation from three non-collinear points on the circle after standardizing the quadratic equation by dividing above special quadratic equation by coefficient a to obtain $c_1=d/a$, $c_2=e/a$, and $c_3=f/a$, in the objective function:

$$x^2+y^2+c_1x+c_2y+c_3=0$$

which is one equation with three unknowns $c_i$.

If the three given points $p_t=(x_i, y_i)$, t=1, 2, 3, are $(x_1, x_2)$, $(x_2, y_2)$ and $(x_3, y_3)$. The points constitute three constraints upon the modified objective function equation to form a system of equations given by the matrix:

$$\begin{bmatrix} x^2+y^2, & x, & y, & 1 \\ x_1^2+y_1^2, & x_1 & y_1, & 1 \\ x_2^2+y_2^2, & x_2, & y_2, & 1 \\ x_3^2+y_3^2, & x_3, & y_3, & 1 \end{bmatrix}$$

whose determinant is identically zero, and which may be solved if the cofactor of the $(x^2+y^2)$ term is not zero (i.e., the $p_t$ are not collinear). The expanded determinant is the desired quadratic equation.

In practice, one or the other method may be used to find the radius. A curvature value may be determined using only four tracking points, whereas according to another embodiment, three points may form a near congruent acute triangle, but because this condition cannot be known to exist a priori it is easier to track the curvature by the first method and use the other method after both arc end-points have been detected.

Elliptical Paths

When the axes are unequal a more general form of the quadratic equation applies:

$$ax^2+by^2+dx+ey+f=0$$

where a>b>0. Standardizing this quadratic equation by dividing it by coefficient a to get new coefficients $c_0=b/a$, $c_1=d/a$, $c_2=e/a$, and $c_3=f/a$, begets the objective function:

$$x^2+c_0y^2+c_1x+c_2y+c_3=0$$

consisting of four unknowns $c_i$. This equation requires four path constraints in a system of equations given by the matrix:

$$\begin{bmatrix} x^2, & y^2, & x, & y, & 1 \\ x_1^2, & y_1^2, & x_1, & y_1, & 1 \\ x_2^2, & y_2^2, & x_2, & y_2, & 1 \\ x_3^2, & y_3^2, & x_3, & y_3, & 1 \\ x_4^2, & y_4^2, & x_4, & y_4, & 1 \end{bmatrix}$$

for planar positions $p_t=(x_i, y_i)$, t=1, 2, 3, 4.

In the most general setting, the conic axes may not be coincident with the coordinate axes and all quadratic coefficients apply:

$$ax^2+by^2+cxy+dx+ey+f=0.$$

These coefficients require five path constraints in a system of equations given by the matrix:

$$\begin{bmatrix} x^2, & y^2, & xy, & x, & y, & 1 \\ x_1^2, & y_1^2, & x_1y_1, & x_1, & y_1, & 1 \\ x_2^2, & y_2^2, & x_2y_2, & x_2, & y_2, & 1 \\ x_3^2, & y_3^2, & x_3y_3, & x_3, & y_3, & 1 \\ x_4^2, & y_4^2, & x_4y_4, & x_4, & y_4, & 1 \\ x_5^2, & y_5^2, & x_5y_5, & x_5, & y_5, & 1 \end{bmatrix}$$

for planar positions $p_t=(x_i, y_i)$, t=1, 2, 3, 4, 5.

The ellipse being traced may be identified after a lag of five positional data points. In practice, a rotation of conic axes and scaling may be performed a priori to convert the general quadratic into the circle for which identification method has already been given.

Spatial Stylus Paths

It has been shown above that circular paths in a plane may be characterized by their curvature. There is also an extension of this idea to curves in a spatial volume. Given a point p in space, a rate of change of the locus with respect to the path segment s being traced is:

$$dp/ds=idx/ds+jdy/ds+kdz/ds=T.$$

The tangent T is vector along the curve. The tangent may vary in a direction normal to the tangent by a magnitude determined by the curvature κ:

$$dT/ds=\kappa N,$$

so the tangent changes according to the reciprocal of the radius of curvature in the direction of the normal N, pointing towards the center of curvature.

The vectors T and N define a third orthonormal vector B=T×N. This vector is called the Binormal of the curve, and varies along the curve by a magnitude determined by the torsion τ:

$$dB/ds=-\tau N,$$

relative to the Normal of the curve. The torsion indicates the extent to which the curve departs from its osculating plane of curvature containing T and N. The vectors $T_s$, $N_s$ and $B_s$ together form a vector space basis vector $F_s$ known as the moving Frame $F_s=(T_s, N_s, B_s)^T$ and the curve $p_s$, parameterized by s is known as a unit-speed curve. The Frennet-Serret theorem states that a moving frame varies along the unit-speed curve according to the kinematic skew-symmetric parameter matrix $G_s$, whose elements are parameterized by s, $G(s)\equiv G_s$:

$$G(s) = \begin{bmatrix} 0, & \kappa(s), & 0 \\ -\kappa(s), & 0, & \tau(s) \\ 0, & -\tau(s), & 0 \end{bmatrix}$$

according to the Frennet-Serret equation:

$$F_s'=G_sF_s,$$

where (') marks the derivative along the arc d/ds. The fundamental theorem for curves in $R^3$ states that, when κ and τ are continuous over a closed path interval in $R^3$, and κ>0, then there exist unit-speed curves unique up to rotation and translation of initial frame of the path. Furthermore, $G_s$ is invariant under a change of coordinates transformation, i.e., the curvature elements $\kappa(s)$ and torsion elements $\tau(s)$ are tensorial.

Whereas the spherical tracing of Latin block lettering follows curves which have constant curvature $\kappa(s)>0$, and zero torsion $\tau(s)=0$, they do admit non-zero torsion $\tau(s)>0$, to a small proportion of the stylus path near end-points of path segments. Latin cursive lettering, on the other hand, distributes both types of curves over the entire path to effect spiral ligature of constant torsion along the direction of flow of the writing system.

Spherical Paths of Ligatures

The preceding can be elaborated with facts from the mathematics of classic differential geometry Curves on the unit sphere have $\kappa(s)>0$, for all $p_s$. When restricted to orthogonal rotational axes, the moving frame traces piece-wise continuous paths alternating between paths of constant curvature and zero torsion along a rotational orbit and to paths with varying curvature and finite torsion during changes of orbit. Finally, when the sphere under consideration is the unit sphere, the orthogonal paths adhere to the tensorial kinematic parameter $G_s$ in the fundamental theorem of $R^3$ space curves as discussed above.

An arbitrary stylus point path s in $R^3$ has moving-frame coordinates with linear coordinate elements $ds_T$, $ds_N$, and $ds_B$, along vectors $T_s$, $N_s$, and $B_s$, which may be translated to a fixed origin in space and terminate on a unit sphere to form three orthogonal curves called indicatrices for the tangent, principal normal, and binormal. From the Frennet-Serret relation $F_s'=G_sF_s$ one can derive that:

$$ds_T^2 = (T')(T'ds^2)$$
$$= (\kappa^2 N)(Nds^2)$$
$$= (\kappa^2)ds^2$$

$$ds_N^2 = (N')(N'ds^2)$$
$$= (-\kappa B + \tau B)(-\kappa B + \tau B)ds^2$$
$$= (\kappa^2 + \tau^2)ds^2$$

$$ds_B^2 = (B')(B'ds^2)$$
$$= (\tau^2 B)(Bds^2)$$
$$= (\tau^2)ds^2$$

from which one gets the alternate definition of $\kappa$ and $\tau$:

$$\kappa = ds^2_T/ds, \text{ and } |\tau| = ds^2_B/ds.$$

One may also derive, from comparing the three right hand side $ds^2$ expressions above, the equation of Lancret:

$$ds^2_N = ds^2_T + ds^2_B,$$

which defines $\sqrt{(ds^2_N)}$ to be the total curvature incorporating both planar curvature $\kappa$ and torsion $\tau$.

Where two Latin block letter path segments meet, two paths of zero torsion and constant curvature make continuous contact (when following the stylus path) along a ligature curve of non-zero torsion. To characterize this curve we may resort to the canonical representation of a curve.

A canonical representation of a curve $p(s)=P_s$ in the infinitesimal proximity a reference point suitably chosen so that $p(0)=P_{s=0}$, adheres to the Taylor series formula:

$$p(s) = p(0) + \sum_{n=1}^{3} (s^n/n!) d^n(p(0))/ds^n + o(s^3)$$

when p(0) is differentiable up to the third order and the higher order terms $o(s^3)$ converge to zero. This is generally true for the continuous displacement of a stylus tip in the writing volume so, when the Frennet-Serret relation cited previously is applied to the three differential terms $d^n(p(0))/ds^n$, a first approximation for the ligature curve is obtained by retaining only the most significant component in each term of $p_s$. These are:

$$p(s)=(p_1,p_2,p_3)_s=(s,(\kappa_O/2)s^2,(\kappa_O\tau_O/6)s^3).$$

Finally one eliminates parameter s and obtains the canonical description of the ligature curve in the terms of moving frame coordinates.

TABLE 1

LIGATURE COMPONENT APPROXIMATIONS

| Ligature Projections | Plane | Basis | Basis |
|---|---|---|---|
| $p_2 = (\kappa_O/2) p_1^2$ | Osculating | N | T |
| $p_3 = ((\kappa_O\tau_O)/6) p_1^3$ | Rectifying | T | B |
| $p_3 = (\sqrt{2}/3) (\tau_O/\sqrt{\kappa_O}) p_2^{3/2}$ | Normal | B | N |

TABLE 1 illustrates ligature component approximations for a variety of embodiments where N, T, and B are unit vectors.

When we restrict the ligature to a reference sphere M centered at Q from which ligature point $p_s$ forms the vector r, the restriction surface M satisfies $G_s$:

$$(p_s-r)\cdot(p_s-r)-R^2=0.$$

For the curve to make first order contact with the sphere, the condition $dG_s/ds=0$, must be satisfied, and on applying the Frennet-Serret relation, the ligature curve assumes a linear form:

$$r=p+\alpha N+\beta B,$$

where $\alpha$ and $\beta$ are arbitrary real number coefficients. That is, the ligature curve spans the normal plane.

To make second-order contact the condition $d^2(p(0))/ds^2=0$, must be satisfied, and again applying the Frennet-Serret relation and observing that the curvature is positive, the ligature curve assumes a more restricted linear form called the polar axis:

$$r=p+\rho N+\beta B,$$

where $\rho$ is the radius of the osculating sphere. The polar axis is parallel to the binormal B and passes through the center of curvature. Finally to make third order contact, the condition $d^3(p(0))/ds^3=0$, must be satisfied, and again applying the Frennet-Serret relation and observing that the torsion is not zero, the ligature curve assumes a more restricted linear form:

$$r=p+\rho N+(\rho'/\tau)B,$$

that is, the polar axis varies along the binormal, according to the rate of change of the radius (of curvature) in relation to the torsion. None of the coefficients in this linear form of the polar axis are arbitrary, wherein there exists only one sphere that is unique up to the curvature and torsion. If the curvature is constant, r traces a circular helix.

The implication of the foregoing teachings is that for the spherical orbital paths of a stylus tip, in the limiting case where the ligature approaches arc length of zero, the polar axis of the stylus path rotates from a the center of the first orbital path to the center of the second orbital path. The ligature torsion is therefore fully described, in the limiting case by the linear offset of the orbital contact point, the rotation of polar axis from one to the other center of curvature, and the change in curvature between the two.

To effect a Latin block letter 'L' for example, the limiting ligature is a $\sigma_z$ rotation of the polar axis of the stylus path by $\phi=+\pi/2$, at the y-axis offset of the contact point, and the reduction of radius of curvature from unity to $2^{-1/2}$.

Recognition of Ligatures

Ligatures amount to changes in direction of the stylus path. The ligatures may be detected by limit points in the spatial data.

A stationary stylus at the initial endpoint of the path segment has no direction other than that of the ray $\sigma_0$, from the center of the reference sphere. This ray is immediately impacted by an angular impulse $\sigma_i$; i=x, y, or z. Position readings $p_t$, at time t will vary from a constant by $\delta p_t=(p_{t+1}-p_t)$ in at least one coordinate $p_{i,t+1}-p_{i,t}$. This initial impulse is torsion-free, but between orbital paths, at least two coordinates, for example, x and y will vary from the constant. The relative sign of the change will indicate whether the polar axis of rotation $\sigma_z$ is positive or negative. The important determinant for torsional ligature is that the rotation must be detected in the smallest vicinity of the orbital path contact point.

The choice of the first plane of osculating circle is indeterminate because there are at least two valid selections of complementary axes. For uniqueness of notation and orientation, we impose in this method a rule that: the initial torsional impulse must occur along the Z-axis from the center of the writing volume.

An illustrative description of the above rule is that the initial condition in the formation of a written character is to imagine a degenerate osculating sphere of zero radius. In the initial condition of this illustration, a hypothetical stylus of zero reference length may be contained in the degenerate zero sphere.

The first component of torsion to be asserted in the first impulse, the change in radius, is then forced in the positive Z-axis direction to initialize positioning at zenith, usually to a magnitude of $2^{1/2}$.

The second condition of the illustration depicts a hypothetical stylus whose writing tip has been allowed to grow to the zenith of the $2^{1/2}$ radius sphere while the other end is still at the center of the sphere. The hypothetical stylus is therefore aligned with the Z-axis in an upside-down orientation after asserting the lifting of the stylus tip into the positioning volume.

Following the placement of the initial hypothetical stylus tip position at the zenith of the $2^{1/2}$ sphere, one then rectifies the orientation of the hypothetical stylus by raising the back end of the stylus while keeping the tip fixed, until the stylus tip points in the direction of next intended rotational path. To do so one must rotate the hypothetical stylus in the osculating plane for the first rotational path. This, in effect, selects an azimuthal plane of the meridian, which defines the first constant curvature stylus path. The hypothetical stylus then corresponds exactly to the unit tangent indicatrix vector of the stylus path.

Tracking the hypothetical stylus with the unit indicatrix tangent vector of the path of the stylus tip ensures that the torsional components that define the orbit are asserted completely independent from the curvature components which define only the extent of the rotation in the selected orbit.

Equivalence of Representation

Under the preferred configuration space there exists an equivalence between the geometric images made by an inked stylus tip and the dual point matrix of ink end-points, when the latter point matrix form the foci of stylus positioning rotational impulses. It is therefore only necessary to fully describe one of the representations because the other dual counterpart may be derived therefrom.

In an embodiment according to the present invention, visualizing a morphological description of handwriting images may be used. The writing surface of the spatial chirographic sign reader may be used to establish an inked surface, while the complementary rotary stylus positioning impulses may also be used to calibrate the recognition parameters of a particular user. A notation for classifying both the inked orbital segments and positioning impulses may be devised for describing one embodiment of the proposed discretization method.

Figure 4:
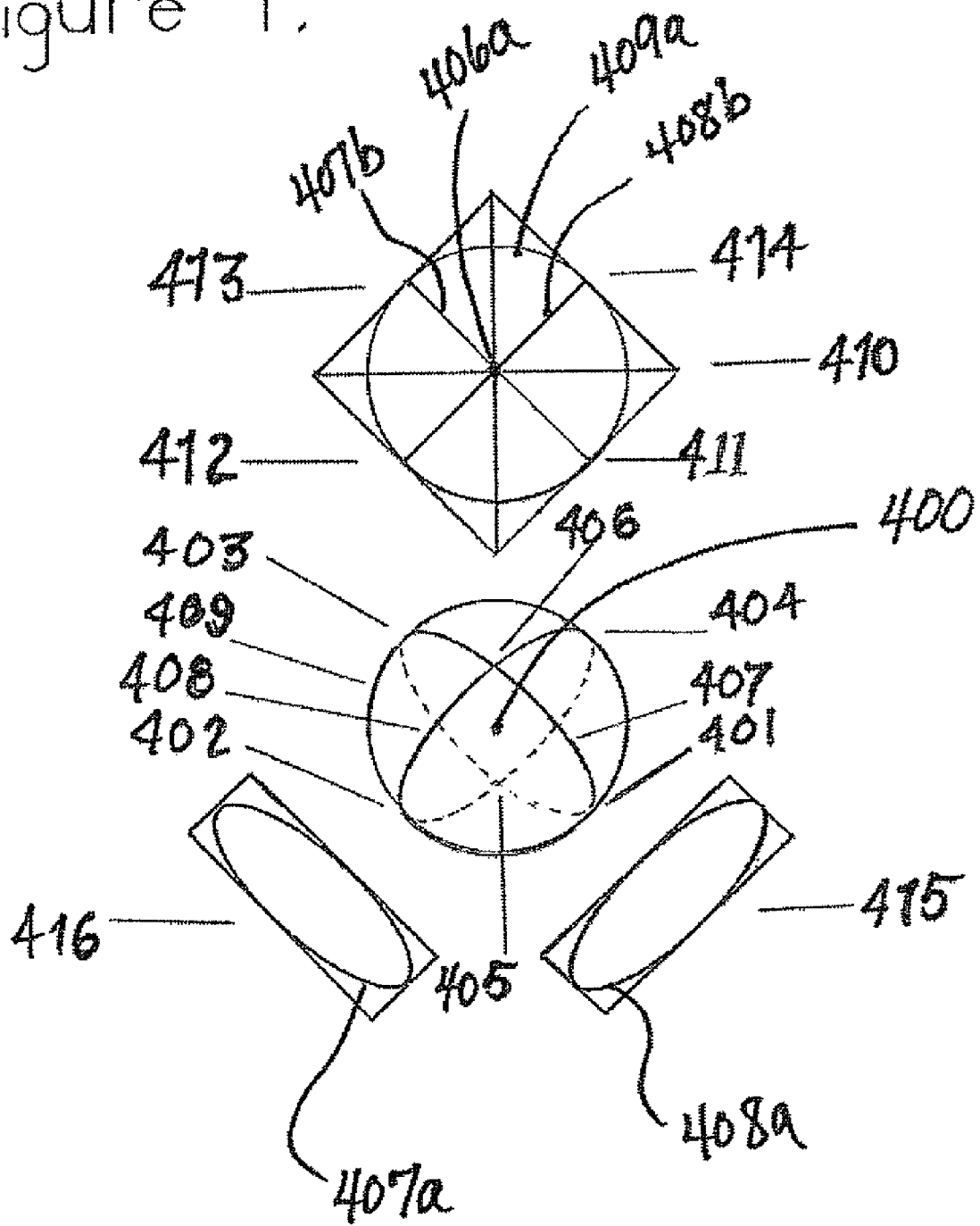
FIG. 4 is an attitude sphere illustrating a cross-sectional plan view of a standard font face projection and two elevation cross-sections viewed from North and East according to an embodiment of the present invention.

The state of the stylus tip location with respect to the directional attitude sphere is described by the cardinal points and illustrated in FIG. 4. Using the orbital path operator coordinates $\sigma_i$ and the angular state by the rotational angle modulo $\pi/2$, the states range from origin O=0, to unity in the radial direction of the rotational starting point on the unit sphere at state 1, and to states 2, 3, and 4, around each axis i. With this scheme, path segments are formed with 5×5, state transition matrices $\sigma_i$, i=o, x, y, and z, and where the transitions between orbital paths also forms a 3×3, matrix of orbit intersections at coincident end-points.

The states that are pertinent to the inking paths are those whose end-points are significant in the projection onto the X-Y plane. Principally, linear paths (and their parallels) may be traced by $\sigma_x$, $\sigma_y$, and their combination $\sigma_{xy}$, by some rational factor Q, and circular paths (and their parallels) may be traced by $\sigma_z$. The combinations $\sigma_{yx}$ may be dropped if one adopts the convention to define Q one way only, say $\phi_x/\phi_y$, wherein the reciprocals of the $\sigma_{xy}$ factors span the factors of the permuted components $\sigma_{yx}$.

Similarly, redundant states of $\sigma_i$, I=x, y, z may be dropped if only one hemisphere is considered on states, and only states 0, 1, and 2, are recognized. The state designated by 2, then is a rotation from 1, by $\pi/2$, and the state designated 3, becomes a spherical inversion of state 1, the state designated 4, may be an inversion of state 2.

Universal Coordinates

The coordinates of the stylus position are fully described using three numeric coordinate vectors that are shown below for the common cardinal points. The impulse vector $\rho=(\rho_x, \rho_y, \rho_z)$ selects a plane of rotation, the rotation vector $\sigma=(\sigma_x, \sigma_y, \sigma_z)$ specifies rotation, and the position vector $P=(X, Y)$ specifies translation on the typeface projection.

TABLE 2

| Graduating Principal Cardinal Directions with Universal Coordinates | | | | | | | | |
|---|---|---|---|---|---|---|---|---|
| Cardinal | Points | $\rho_x$ | $\rho_y$ | $\rho_z$ | $\sigma_x$ | $\sigma_y$ | $\sigma_z$ | X | Y |
| Origin | Q | 0 | 0 | 0 | 0 | 0 | 0 | 0 | 0 |
| Zenith | Z |  | 1 | 1 | 1 | 1 | 0 | 0 | 0 |
| Nadir | O |  |  | −1 | 3 | 3 | 0 | 0 | 0 |
| North | N |  | 1 |  | 2 | 0 | 1 | 0 | 1 |
| East | E | 1 |  |  | 0 | 4 | 2 | 1 | 0 |
| South | S |  | −1 |  | 4 | 0 | 3 | 0 | −1 |
| West | W | −1 |  | 0 | 0 | 2 | 4 | −1 | 0 |

TABLE 2 illustrates a variety of graduating principal cardinal directions having universal coordinates.

Impulse components $\rho_x$, and $\rho_y$ together represent a twist-action impulse at orbit path changes, and component $\rho_z$ represents the path-initiating positioning impulse, and subsequent radial-action torsion impulse components used to adjust to the inferred sphere's constant-curvature path segments.

The rotational states $\sigma_i$ are not always observable. The scaling of $|\rho|=1$, above allows first order contact between the sphere and font face at the main cardinal points at the midpoint of the font face edges. The corners of the font face are not observable with this is scaling. To get the NE, SE, SW, and NW cardinal points to be observable, the scaling of $|\rho|=2^{1/2}$ needs to be used instead to have the typeface corners make first order contact with the osculating sphere.

So to change paths from a principal meridian to an edge parallel one needs a torsional deformation of $\rho$ by a factor of $\rho=2^{-1/2}$. The procedure for defining a fully observable rotational path of a stylus tip may comprise continually deforming the rotation polar axes to ensure observability in the universal coordinates.

The technique according to an embodiment of the present invention may be obtained by converting the path of the stylus into rotations, and enabling the visual identification of text markings with elements of rotational symmetry groups associated with the lettering on the typeface. Lettering patterns on the typeface may be formed into a configuration space in which various discrete rotations are designated.

The configuration may comprise two stereographic projections of the writing volume. A first positive projection may map the ink markings from a lower hemisphere. A second negative projection may map the positioning paths of the retracted stylus in the upper hemisphere.

The stereographic projection planes are nominally at their respective equators, but they may be merged by moving them to the intersection plane of the two reference hemispheres. The two may then be joined using continuity conditions by joining the non-projected portion of geodesic curves (through the poles) in the equatorial regions into a single point at the joint of the two projected paths.

When the two projections are joined by a gluing at the latitudes of intersection, the writing surface and volume may be bounded by a shallow spherical disc. The orthographic term disc is preferred over disk because the latter is cylindrical with flat sides whereas what is being conveyed is the former, which is hemispherical with spherical sides.

The range of stylus path projection rays may therefore be placed in an open neighborhood of the anti-poles. The outer limit may be the latitude circle of intersection two semi-discs, with center point C at the center of the typeface. The semi-discs may each touch the four corners of the rectangular writing volume. The largest circle that can be traced on that typeface is the circle that touches the mid-points of the typeface edges may be used to define the cardinal directions N, E, S and W relative to C, of the smallest sphere that can be used to include the cardinal directions zenith (Z) and Nadir (O) giving the directional attitude from C of the stylus in the writing volume. Likewise, the smallest circle that contains the typeface corners may be used to define a sphere which touches the corners of typeface at its equator, thereby defining the locations on its surface of cardinal points NW, NE, SE, SW, Z, and O, also relative to center point C.

The stylus may not be restricted to any spherical surface path so a convention may be adopted for adhering to the gluing continuity condition. Ink marking pre-images may be made at the lower surface. Any motion above that surface, even if in the lower semi-disc may be designated to positional path projection in the upper semi-disc, so that the center point C located infinitesimally above the writing surface allows all stylus paths not through C to be converted into rotations, and paths through C to improper rotations or inversion of the axes.

The resulting attitude sphere may describe the position of the stylus tip as a directional attitude and the lower hemisphere. Inking paths may define attitude state transitions defining the form of text characters, whereas upper hemisphere paths define discrete positioning paths. Each text character form may be enumerated by assigning a fixed spatial coordinate frame attitude state from 0 to 3, for rotations ranging from 0 to $\sqrt[3]{2}\pi$, in each axis and forming path segments with 4×4 state transition matrices in each orthogonal axis of rotation, i=x, y, and z, and where the transitions between orbital paths also forms a 3×3 matrix of orbit intersections at coincident end-points. The principal path segments of a character from the block Latin alphabet are then given by a 12×12 transition matrix.

To track an arbitrary path, the stylus path may begin at the center of writing volume and follow in the direction of lifting the tip from writing surface first to establish position, and then in the direction of the first positional path to establish the first plane of rotation. Similarly, the stylus tip may approach the writing surface depth-wise before asserting a direction of pen stroke from the center when the first path is an inking from the center. This convention separates the roles of the Z inversion axis from the X and Y inversion axes. The scaling of the radius of curvature that is asserted by the Z-inversion vector, may be adjusted to make every rotation observable in the coordinates of the osculating sphere.

FIG. 1 illustrates a vertical cross-sectional view of two superimposed stereographic projections in a writing volume 101 according to an embodiment of the present invention. The cross-section comprises horizontal X-axis 110 and vertical Z-axis 112 lying in the plane of the drawing. The writing volume 101 comprises a top 102 and a bottom 103. A Riemann sphere 104 is shown centered above the writing volume top surface 102 with projection pole 105 mapping an inking point 113 in the lower hemisphere onto an equatorial projection plane 106 at projection point 114. The projection plane 106 is shown having a depth perspective by superimposing a depth Y-axis 111 pointing into the drawing page. Another Riemann sphere 107 is shown centered below the writing volume bottom surface 103 having projection pole 108 projecting positioning point 115 in the upper hemisphere onto an equatorial projection plane 109 at projection point 116.

Figure 2:
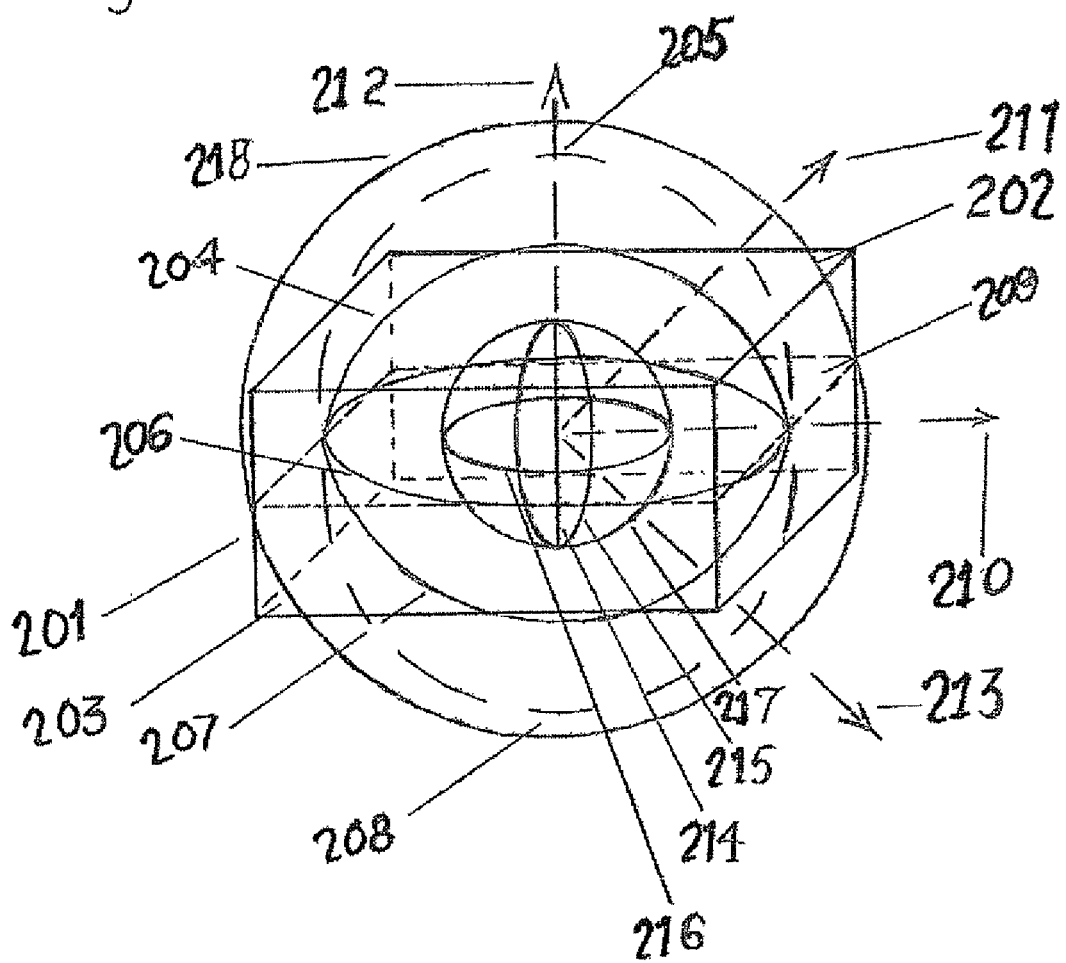
FIG. 2 is a wire-frame non-isometric perspective view illustrating a writing volume, a merged projection disc, and an inset attitude sphere according to an embodiment of the present invention.

FIG. 2 is a wire-frame non-isometric perspective view illustrating a writing volume 201, a merged projection disc 206, and an inset attitude sphere 217 according to an embodiment of the present invention. The writing volume 201 is illustrated being outlined by a cubical shape traced by edges parallel to a horizontal X-axis 210, a vertical z-axis 212, and a depth y-axis 211, as oriented in FIG. 2.

An upper surface 202 may enclose a portion of Riemann sphere 204 for which projections from pole 208 may be within the writing volume 201. A projection plane may be moved from an equatorial circumference of the Riemann sphere 204 to a mid-plane 209 of the cubical writing volume 201, where the projection plane may truncate the Riemann sphere 204 along parallel circle 206. A lower surface 203 may enclose another portion 207 of Riemann sphere 204 for which projections from pole 205 may be within writing volume 201.

Similarly, the projection plane may be moved to a truncation latitude on parallel circle 206 in mid-plane 209. Portions of the two segments of the Riemann sphere involved in the projections are drawn in FIG. 2 having a solid line and together may form a disc, whereas a remainder of the Riemann sphere may be depicted in broken lines in FIG. 2.

A center of mid-plane 209 may also serve as a center of enclosed attitude sphere 217, wherein rotations about the z-axis 212 may be depicted by a parallel circle 216 on the sphere 217. Rotations about the y-axis 211 may be depicted by a vertical circle 215 also disposed upon attitude sphere 217 and rotations about the x-axis 210 may appear and be depicted as straight line 214. If the x-axis 210 is rotated to an isometric position, for example as shown by directional line 213, then the rotation about the x-axis 210 along line 213 may be about the vertical circle 215.

Attitude sphere 214 may be the largest sphere whose equatorial circumference adjoins square projection area 209. Sphere 218 may be the smallest sphere having paths covering all of square projection area 209, touching corners of square projection area 209, wherein sphere 218 may be used as a tracer for rotation paths.

FIG. 3 illustrates a wire-frame isometric perspective view of an attitude sphere 313 having three orthogonal rotation planes 310, 311, and 312 according to an embodiment of the present invention. FIG. 3 illustrates attitude sphere 313 centered at nadir 300 in writing volume 301. Top surface 3022 intersects z-axis 308 at intersection point 305 in a direction of the spatial zenith 314.

Similarly, y-axis 307 intersects the north face at intersection point 304 and x-axis 306 intersects the east face at intersection point 303. The plane of rotation for x-axis 306 is attitude circle 310, the plane of rotation for y-axis 307 is attitude circle 311, and the plane of rotation for the z-axis 308 is attitude circle 312. The reference cardinal directions are given by points on the attitude sphere 313, for example, East 316, North 315, and zenith 314. Another sphere 317, is the largest sphere whose exterior circumference falls within square projection area 309.

FIG. 4 illustrates an attitude sphere 409 having a cross-sectional plan view 410 of a standard font face projection and two elevation cross-sectional views 415 and 416 illustrated from the North and East directions according to an embodiment of the present invention. FIG. 4 illustrates two elevation sections 415 and 416 and one plan section 410 of orthogonal faces of attitude sphere 409. The north and east elevations 415, 416, respectively, are illustrated downwardly positioned in FIG. 4.

The North face elevation section 415 is a plane tangent to North point 401 and containing a parallel projection 408a of great circle 408. The East face elevation section 416 is a plane tangent to East point 402 and containing a parallel projection 407a of great circle 407. Plan section view 410 is a plane tangent to zenith point 406 containing a parallel projection 409a of great circle 409. Great circles 407 and 408 may be projected as straight lines 407b and 408b on plan section view 410 and end-points 411, 412, 413, and 414 may coincide with cardinal directions North point 401, East point 402, South point 403, and West point 404.

The font face marked with great circle grid lines forms a dihedral point group with rotation and reflection around the axes and diagonals. The center of the grid 406a is the projection of the zenith point 406 or the nadir 400 under inking, wherein alternation between the two may occur by inversion of the projection 406a.

Figure 5:
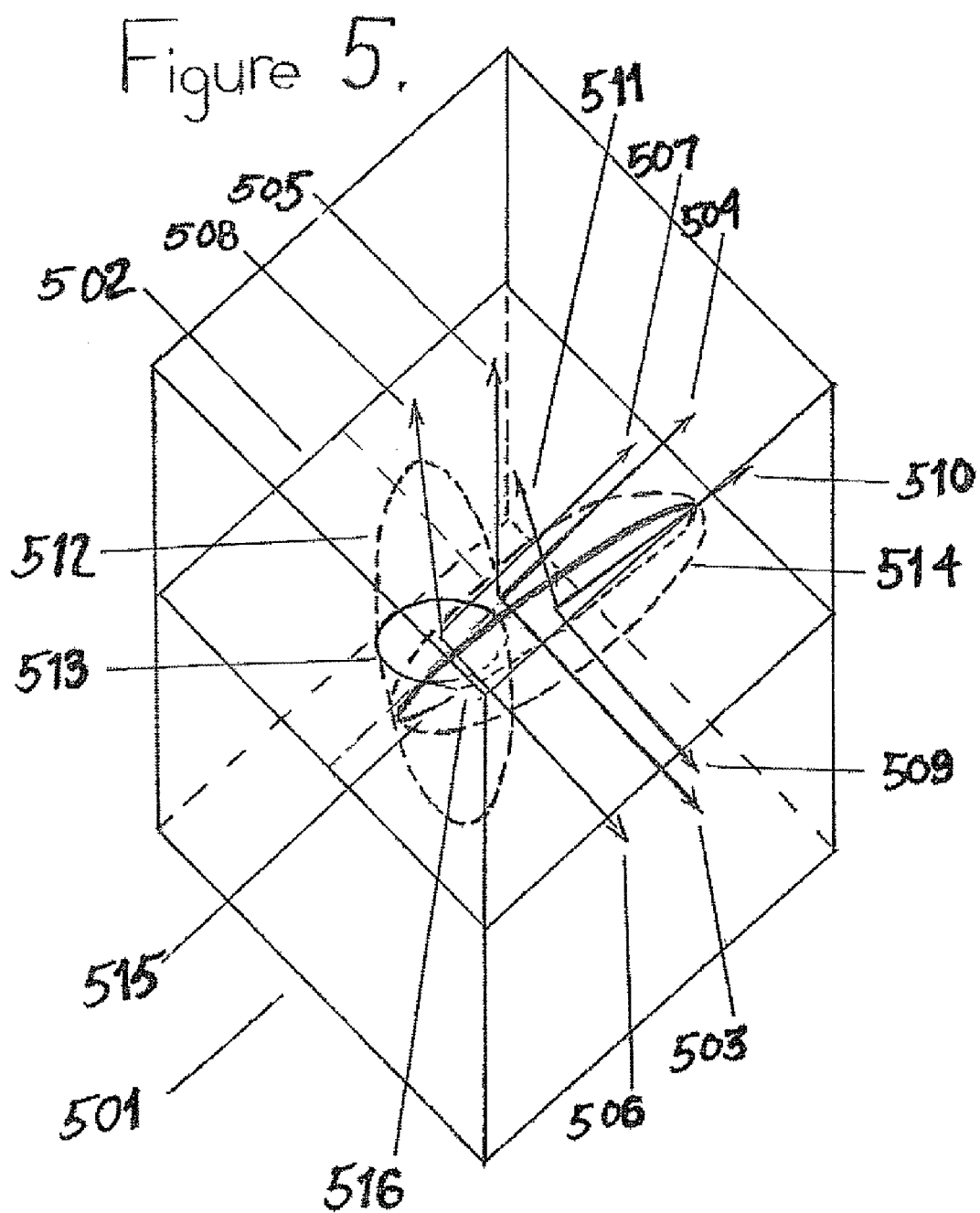
FIG. 5 illustrates a configuration of an ellipsoidal couplet for tracing a cursive letter "d" according to an embodiment of the present invention.

FIG. 5 illustrates a configuration of an ellipsoidal couplet for tracing a cursive letter "d" according to an embodiment of the present invention. FIG. 5 illustrates partitioning of the writing volume 501, into two with identical ellipsoids 512 and 514 for supporting cursive handwriting being illustrated here with the cursive letter 'd' strokes. The font face 502 of the original configuration with orthogonal (x, y, z)-axes 503, 504, and 505, respectively, may be supplanted by two orthogonal (x', y', z')-axes 506, 507, and 508, respectively, and (x", y", z")-axes 509, 510, and 511, respectively. The cursive strokes may correspond to a curve trace of "C" 513, about axis z' 508 and may be followed by another "C" trace 515, about axis z" 511. The latter rotation may be selected to aid visualization because an alternative x" 509 rotation may be equally well served but may not be easily depicted in the isometric projection illustrated in FIG. 5. Between the two independent rotations there may exist an interpolation connection 516 following a cursive spiral ligature path from one rotation to another rotation.

Enumerating Stylus Rotational Paths Geodesic Stylus Paths

A dihedral point matrix may be generated by the symmetries of the typeface illustrated in FIG. 4. Geodesic pre-images may be illustrated using only four straight pen strokes, each passing through the center of the typeface. The strokes may be designated by the strokes initial cardinal point (projection label) North N(L), West W(K), Northwest NW(A), Northeast NE(B), and the origin Nadir(O). Using Latin block letters, one may construct four sans-serif font type handwriting letters of a character set from pen strokes, for example, "I", "X", "K", and "Y". The first two may be full-length strokes, and the latter two may comprise half-length strokes. The universal (minimal) stroke size for the four letters may be half-length. Using a AD/Z LR/UD orientation, the initial position may be above the typeface center with no assigned orbit, wherein the letters may be constructed as follows for letter "I" using the following rotational path.

TABLE 3

Tracking Construction of Latin Block Letter "I":

| Stylus Role | Initial | $\sigma_x$ | $\sigma_y$ | $\sigma_z$ | Path | Final | $\sigma_x$ | $\sigma_y$ | $\sigma_z$ |
|---|---|---|---|---|---|---|---|---|---|
| Positioning | Z | 1 | 1 | 0 | $+\sigma_x$ | N | 2 | 0 | 1 |
| Inking | N | 2 | 1 | 0 | $+\sigma_x$ | O | 3 | 3 | 0 |
| Inking | O | 3 | 3 | 0 | $+\sigma_x$ | S | 4 | 0 | 3 |
| Positioning | S | 4 | 0 | 3 | $+\sigma_x$ | Z | 1 | 1 | 0 |

TABLE 3 illustrates steps which may be performed in constructing the Latin block letter "I" according to an embodiment of the present invention.

The path operation illustrated may be interpreted as traversing $\phi=+\pi/2$, rotation. Points such as North (N) and South (S) may not be stereographically placed $\pi/2$, radians from either the Origin (O) or the Zenith (Z), but the convention adopted for geodesic paths is that path segments between say the Origin and North (ON) and the Zenith and North (ZN) may be collapsed into the same projection point. This may not be true when the path is not geodesic. A similar set of steps for starting and ending at Zenith (Z) using the following rotational path for letter "X" is disclosed.

TABLE 4

Tracking Construction of Latin Block Letter "X"

| Stylus Role | Initial | $\sigma_x$ | $\sigma_y$ | $\sigma_z$ | Path | Final | $\sigma_x$ | $\sigma_y$ | $\sigma_z$ |
|---|---|---|---|---|---|---|---|---|---|
| Positioning | Z | 1 | 1 | 0 | $+\sigma_x-\sigma_y$ | NE | 2 | 4 | 1.5 |
| Inking | NE | 2 | 4 | 1.5 | $+\sigma_x-\sigma_y$ | O | 3 | 3 | 0 |
| Inking | O | 3 | 3 | 0 | $+\sigma_x-\sigma_y$ | SW | 4 | 2 | 3.5 |
| Positioning | SW | 4 | 2 | 3.5 | $+\sigma_x-\sigma_y$ | Z | 1 | 1 | 0 |
| Positioning | Z | 1 | 1 | 0 | $+\sigma_x+\sigma_y$ | NW | 2 | 2 | 4.5 |
| Inking | NW | 2 | 2 | 4.5 | $+\sigma_x+\sigma_y$ | O | 3 | 3 | 0 |
| Inking | O | 3 | 3 | 0 | $+\sigma_x+\sigma_y$ | SE | 4 | 4 | 2.5 |
| Positioning | SE | 4 | 4 | 2.5 | $+\sigma_x+\sigma_y$ | Z | 1 | 1 | 0 |

TABLE 4 discloses steps for construction the Latin block letter "X" according to an embodiment of the present invention.

Using four orbitals to transition from a first to a second stroke of the "X" may be cumbersome because every orbital may pass through the zenith Z or the origin or Nadir O. A mechanism for bypassing the center point may be provided.

TABLE 5

Tracking Construction of the Latin Block Letter "K"

| Stylus Role | Initial State | Path | Final State |
|---|---|---|---|
| Positioning | Z | $+\sigma_x$ | N |
| Inking | N | $+\sigma_x$ | O |
| Inking | O | $+\sigma_x$ | S |
| Positioning | S | $+\sigma_x$ | Z |
| Positioning | Z | $+\sigma_x - \sigma_y$ | NE |
| Inking | NE | $+\sigma_x - \sigma_y$ | O |
| Inking | O | $+\sigma_x + \sigma_y$ | SE |
| Positioning | SE | $+\sigma_x + \sigma_y$ | Z |

TABLE 5 discloses steps for constructing the Latin block letter "K" according to an embodiment of the present invention.

For letter "Y", some path segments may either begin or end at the nadir O, wherein the convention thus far may not support an associated half-stroke Inking. To support half-stroke Inking, an inversion involving a degenerate rotation may be used because the stylus path may be along a polar projection ray. An extension of a stylus may be indicated by inversion of zenith Z with anti-zenith –Z and retraction of the stylus by inversion of the origin or Nadir O with an anti-Nadir –O providing the following rotational path for "Y".

TABLE 6

Tracking Construction of Latin Block Letter "Y"

| Stylus Role | Initial State | Path | Final State |
|---|---|---|---|
| Positioning | Z | $+\sigma_x + \sigma_y$ | NW |
| Inking | NW | $+\sigma_x + \sigma_y$ | O |
| Inking | O | $-\sigma_x + \sigma_y$ | NE |
| Positioning | NE | $-\sigma_x + \sigma_y$ | Z |
| Inverting | Z | $\rho_z$ | O |
| Inking | O | $-\sigma_x$ | S |
| Positioning | S | $-\sigma_x$ | Z |

TABLE 6 discloses steps in constructing the Latin block letter "Y" according to an embodiment of the present invention.

Inversion of the zenith Z to the Nadir O may change the orientation wherein a previous northbound rotation $-\sigma_x$ may be continued by reversal to southbound $-\sigma_x$ in an inverted configuration space. The overall path is not unique as there are six permutations of the three path segments.

Geodesic Parallels

The next grouping of Latin block letters are those for which the stylus tip follows a path parallel to the geodesic path but offset therefrom. The letters that fall into this category include "E", "F", "H", "L", "N", "T", and "Z".

There are four such full-length parallel displacements enumerated using cardinal points in a circular sequence: Northwest to Northeast NW-NE, Northeast to Southeast NE-SE, Southeast to Southwest SE-SW, and Southwest to Northwest SW-NW, which may be rewritten: North, West to East N(W-E), North to South, East (N-S)E, South, East to West S(E-W), and South to North, West (S-N)W, thus highlighting a translation given by the start-to-end, and mid-point. Setting the clockwise endpoint as the positive end of the range, the end-points may be specified by the mid-point label (N, E, S, or W) and sign ("–" for anti-clockwise offset, "+" for clockwise offset), so that the end-points may be transposed and remain unique in summary: [N E S W]± (where the square brackets means "any one of" the enclosed terms), and may be explained by the following table of parallel orbital states.

TABLE 7

Parallel Orbital States

| Full | Anchored | Label | Endpoint | State |
|---|---|---|---|---|
| NW-NE | N, W-E | NEW | N+ | N+ |
| NE-SE | N-S, E | NSE | +E | E+ |
| SE-SW | S, E-W | SEW | S+ | S+ |
| SW-NW | S-N, W | SNW | +W | W+ |
| NW-SW | N-S, W | NSW | –W | W– |
| SW-SE | S, W-E | SWE | S– | S– |
| SE-NE | S-N, E | SNE | –E | E– |
| NE-NW | N, E-W | NEW | N– | N– |

TABLE 7 discloses end-point transposition using parallel orbital states according to an embodiment of the present invention.

A state such as S– above may be spatially the same location as E+ and SE, but each orbital state may belong to distinct orbital paths. When two parallel paths are composed at a point of contact, an E+ and S– state, for example, may notationally and geometrically combine into SE if one reverts to s precedence notation S–+E and cancels the sign. A cardinal designation may be based upon rotations $\sigma_z$. A first letter with only one such parallel translation is, the "leg" in the letter "L", for example.

TABLE 8

Tracking Construction of the Latin Block Letter "L"

| Stylus Role | Initial State | Path | Final State |
|---|---|---|---|
| Positioning | Z | $+\sigma_x$ | N |
| Inking | N | $+\sigma_x$ | O |
| Inking | O | $+\sigma_x$ | S |
| Inking | S | $+\sigma_y$ | S– |
| Positioning | S– | $+\sigma_x + \sigma_y$ | Z |

TABLE 8 discloses steps in constructing the Latin block letter "L" according to an embodiment of the present invention.

Parallel translation may be achieved trivially by freezing the stylus at a constant geodesic offset and translating other rotation axes around a parallel circle at the offset. The state S may remain in the same inking hemisphere, hiding that the operation did not cover an entire $+\pi/2$ rotation.

It may be determined whether a path orbit continues beyond a prior one to any one of N, E, S, or W, or whether the path orbit terminates. The zenith Z or nadir O may also be offset by any of the primary cardinals.

Disclosed below is a parallel offset of Z to N, denoted ZN, which arises in positioning for the Latin block letter "E".

TABLE 9

Tracking Construction of the Latin Block Letter "E"

| Stylus Role | Initial State | Path | Final State |
|---|---|---|---|
| Starting | Z | $+\sigma_x$ | N |
| Inking | N | $+\sigma_x$ | O |

TABLE 9-continued

Tracking Construction of the Latin Block Letter "E"

| Stylus Role | Initial State | Path | Final State |
|---|---|---|---|
| Inking | O | $+\sigma_x$ | S |
| Inking | S | $+\sigma_y$ | S− |
| Inverting | S− | $\rho_z$ | ZS− |
| Positioning | ZS− | $+\sigma_x + \sigma_y$ | Z |
| Inverting | Z | $\rho_z$ | O |
| Inking | O | $+\sigma_y$ | E |
| Inverting | E | $\rho_z$ | ZE |
| Positioning | ZE | $+\sigma_x + \sigma_y$ | ZN |
| Inverting | ZN | $\rho_z$ | N |
| Inking | N | $+\sigma_y$ | N+ |
| Inverting | N+ | $\rho_z$ | ZN+ |
| Positioning | ZN+ | $-\sigma_x + \sigma_y$ | Z |

TABLE 9 discloses construction of the Latin block letter "E" according to an embodiment of the present invention.

Similar paths may be traced for the letter "F". The same may be performed for "N", "Z", "T", and "H", however, doing so with the existing grid may create broad lettering. Therefore, kerning may alternatively be applied.

Kerning Geodesic Paths

Frequently, end-points provided by full and half-length orbitals in a grid may not be sufficient for formation of certain user-preferred lettering. For example, the positive North N+ and negative North N− end-points of the letter "T" may be shortened to half the normal offset from the axis of symmetry. Similarly, the end-points of the bottom end-points of the letter "A" may also be shortened to half the normal offset from the axis of symmetry. It may be easier to perform a kerning to move the axis of symmetry by half of a full parallel offset in an embodiment according to the present invention.

The grid may be subdivided so that the full symmetries may be repeated in half the size to which the letter may be 'kerned'. The method may begin with a full parallel translation elaborated with fractional offsets. The full offsets regarded thus far include: [N E S W]±, Z[N E S W], and O[N E S W]. Elaboration may add subdivisions at ¼, ⅓, ½, ⅔, ¾, etc., of the whole offset. One way to do so may be to assume that the full offsets are factored by unity. For completeness, the process may also proceed in a reciprocal direction to not fractionate symmetry distances, but rather to multiply the symmetry distances with reciprocal factors 4/3, 3/2, 2, 3, 4, etc., of the whole offsets. The geometric division and multiplication may cause an equivalent magnification and attenuation of the angular momentum impulses used to match the new geometry. The letter Q may be described to indicate a rational kerning factor.

Illustrated below is a kerning that does not involve a subdivision of the grid. The letter "N" uses a slanted middle path that may be derived from the offset. Without kerning, the slant traces a geodesic from negative North N− to negative South S− causing a very wide letter 'N'. By applying positioning paths illustrated above, the widening may be avoided by offsetting in only one direction and shifting lettering to one side.

TABLE 10

Tracking Construction of the Latin Block Letter "N"

| Stylus Role | Initial State | Path | Final State |
|---|---|---|---|
| Positioning | Z | $+\sigma_x$ | N |
| Inking | N | $+\sigma_x$ | O |
| Inking | O | $+\sigma_x$ | S |

TABLE 10-continued

Tracking Construction of the Latin Block Letter "N"

| Stylus Role | Initial State | Path | Final State |
|---|---|---|---|
| Positioning | S | $+\sigma_x$ | Z |
| Positioning | Z | $+\sigma_x$ | N |
| Inking | N | $+\sigma_x + ½\sigma_y$ | E+ |
| Inking | E+ | $-\sigma_x$ | E− |
| Positioning | E− | $-\sigma_x + \sigma_y$ | Z |

TABLE 10 discloses steps for constructing the Latin block letter "N" according to an embodiment of the present invention.

Here the kerning factor is Q=½. The factor Q may be more essential than the resulting offset because the overall shape of the letter matters more in recognition than where the letter is located along the parallel offset. Q cannot be arbitrary. Q may have a value geometrically compatible to adjacent factors so that the path meets at allowable positions in the point matrix.

Illustrated below is a kerning centered in the typeface instead of offset to a side of the letter "A".

TABLE 11

Tracking Construction of the Latin Block Letter "A"

| Stylus Role | Initial State | Impulse | Final State |
|---|---|---|---|
| Starting | Z | $+\sigma_x$ | N |
| Inking | N | $+\sigma_x - ¼\sigma_y$ | ¼W |
| Inking | ¼W | $+\sigma_x - ¼\sigma_y$ | S + ½ |
| Inverting | S + ½ | $\rho_z$ | ZS + ½ |
| Positioning | ZS + ½ | $+\sigma_x + ¼\sigma_y$ | Z¼W |
| Positioning | Z¼W | $+\sigma_x + ¼\sigma_y$ | ZN |
| Inverting | ZN | $\rho_z$ | N |
| Inking | N | $+\sigma_x + ¼\sigma_y$ | ¼W |
| Inking | ¼W | $+\sigma_x + ¼\sigma_y$ | S + ½ |
| Inverting | S + ½ | $\rho_z$ | ZS + ½ |
| Positioning | ZS + ½ | $+\sigma_x + ½\sigma_y$ | Z |
| Positioning | Z | $+¼\sigma_y$ | Z¼W |
| Inverting | Z¼W | $\rho_z$ | ¼W |
| Inking | ¼W | $+½\sigma_y$ | ¼E |
| Inverting | ¼E | $\rho_z$ | Z¼E |
| Positioning | Z¼E | $+¼\sigma_y$ | Z |

TABLE 11 discloses steps in constructing the Latin block letter "A" according to an embodiment of the present invention.

The foregoing letter constructions permit categorization of all possible linear writing strokes. In particular, the construction permits the letters "T" and "V" using the same kerning factor as is used in the letter "A" example above. Other letters, such as "W" and "M", require higher factoring because their vertical midpoints are offset by more than a full height and are reflected back to Q=3 or Q=4, depending upon the lettering style. For the Q=4 style, the midpoint of the letter "M" or "W" may be folded back into the typeface onto the far typeface edge, whereas in the Q=3 style, the midpoint of the letters may be folded back to the half-way x=0 centerline of the typeface. The letters' horizontal center may have Q=½, as has already been shown. Illustrated below using Q=4 is a construction of the letter "M" according to an embodiment of the present invention.

TABLE 12

Tracking the Construction of the Latin Block Letter "M"

| Stylus Role | Initial State | Impulse | Final State |
|---|---|---|---|
| Starting | Z | $-\sigma_x$ | S |
| Inking | S | $2(-\sigma_x + \frac{1}{8}\sigma_y)$ | $N + \frac{1}{4}$ |
| Inking | $N + \frac{1}{4}$ | $2(+\sigma_x + \frac{1}{8}\sigma_y)$ | $S - \frac{1}{2}$ |
| Inking | $S + \frac{1}{2}$ | $2(-\sigma_x + \frac{1}{8}\sigma_y)$ | $N + \frac{3}{4}$ |
| Inking | $N + \frac{3}{4}$ | $2(+\sigma_x + \frac{1}{8}\sigma_y)$ | S– |
| Inverting | S– | $\rho_z$ | ZS– |
| Positioning | ZS– | $+\sigma_x + \sigma_y$ | Z |

TABLE 12 discloses steps used in constructing of the Latin block letter "M" according to an embodiment of the present invention.

Another embodiment according to the present invention is directed to curved strokes and construction of Latin block letters comprising circular curves.

Curved Stylus Paths

Circular paths may be projected by parallel offsets of an equatorial great circle lying in the Z-axis. The largest such circle fitting into the typeface is the circle through the cardinal points N, E, S, and W. An exemplary letter to construct according to an embodiment of the present invention is the large Latin block capital letter "O" constructed as follows.

TABLE 13

Tracking Construction of the Latin Block Letter "O"

| Stylus Role | Initial State | Path | Final State |
|---|---|---|---|
| Positioning | Z | $+\sigma_x$ | N |
| Inking | N | $+\sigma_z$ | E |
| Inking | E | $+\sigma_z$ | S |
| Inking | S | $+\sigma_z$ | W |
| Inking | W | $+\sigma_z$ | N |
| Positioning | N | $-\sigma_x$ | Z |

TABLE 13 discloses steps used in constructing the Latin Block Letter "O" according to an embodiment of the present invention.

The Latin block letter "C" uses some of the same letter "O" inking segments along the cardinal directions N, E, S, and W, but to position other segments out of ink, the outer grid circle N+, E+, S+, and W+ may be used for end-point positioning to achieve the following paths for the letter "C".

TABLE 14

Tracking Construction of the Latin Block Letter "C"

| Stylus Role | Initial State | Impulse | Final State |
|---|---|---|---|
| Positioning | Initial State Z | $-\sigma_y$ | ZE |
| Positioning | ZE | $+\frac{1}{2}\sigma_x$ | $ZN_{+1/\sqrt{2}}$ |
| Inverting | $ZN_{+1/\sqrt{2}}$ | $\rho_z$ | $N_{+1/\sqrt{2}}$ |
| Inking | $N_{+1/\sqrt{2}}$ | $+\sigma_z$ | $N_{-1/\sqrt{2}}$ |
| Inking | $W_{+1/\sqrt{2}}$ | $+\sigma_z$ | $W_{-1/\sqrt{2}}$ |
| Inking | $S_{+1/\sqrt{2}}$ | $+\sigma_z$ | $S_{-1/\sqrt{2}}$ |
| Inverting | $S_{-1/\sqrt{2}}$ | $\rho_z$ | $ZS_{-1/\sqrt{2}}$ |
| Positioning | $ZS_{-1/\sqrt{2}}$ | $+\sigma_x + \sigma_y$ | Z |

TABLE 14 discloses steps used in constructing the Latin Block Letter "C" according to an embodiment of the present invention.

Positioning of the stylus between cardinal points may cause offsets of $1/\sqrt{2}$ due to using the larger cycle in end-point positioning.

Other Circular Paths

A circular curve of half diameter may occupy one quarter of the typeface. To center the circular curve in the Northeast NE quadrant, a linear translation of typeface center p=(0, 0) to p'=(½, ½) may be used. The radius of the half-diameter circle may match that of a Z-axis parallel circle at Z-offset Z+½, of half the equatorial radius. The quadrant circle may be fully defined by the radius of the diminished circle and X-Y location of its center. The path descriptions can therefore be given directly by the translation offset of the origin and the radius-scaling factor. Apart from creation of inking paths, such as the ones shown for 'O' and 'C', the general path recognition process for smaller circular paths may comprise detection of the diameter of the curve and the position of its center.

The implementation of parameterization may depend upon the writing system. Latin block letters tend to center half-circles in quadrants, whereas Greek letters tend to center half-circles on the centerline. For completeness, illustrated below is a table of inking paths for major circles of the Latin block letters "C", "D", "G", "O", and "Q" and for minor circles of the Latin block letters "B", "J", "U", "P", "R", and "S".

TABLE 15

Circular Segments of Latin Block Letters

| Letter | Size | Kerning | Major | Minor Top | Minor Bottom |
|---|---|---|---|---|---|
| C | Major | Left | N+, $-3\sigma_z$, S– | | |
| D | Major | Right | N, $+2\sigma_z$, S | | |
| G | Major | Left | N+, $-3\sigma_z$, S– | | |
| O | Major | None | , $+4\sigma_z$, | | |
| Q | Major | None | S, $+4\sigma_z$, S | | |
| B | Minor | Right | | N, $+2\sigma_z$, S | N, $+2\sigma_z$, S |
| J | Minor | Left | | | E, $+\sigma_z$ |
| U | Minor | None | | | E, $+2\sigma_z$ |
| P | Minor | Right | | N, $+2\sigma_z$, S | |
| R | Minor | Right | | N, $+2\sigma_z$, S | |
| S | Minor | None | | N+, $-2.5\sigma_z$, S | N, $+2.5\sigma_z$, S+ |

TABLE 15 discloses circular segments used in constructing several Latin block letters according to an embodiment of the present invention.

Circular Segments Other Writing Systems

TABLE 16

Occidental Arabic Numerals

| Symbol | Writing System | Partition | Major | Minor Top | Minor Bottom |
|---|---|---|---|---|---|
| Numeral "3" | Occidental Arabic | Right | | N, $+2\sigma_z$, S | N, $+2\sigma_z$, S |
| Numeral "6" | Occidental Arabic | Right | N, $-2\sigma_z$, S | | S, $-3\sigma_z$, W |

TABLE 16 discloses segments used in constructing occidental Arabic numerals according to an embodiment of the present invention.

Occidental Arabic numerals fit into a similar structure as the Latin block letters by fitting a first level of partitioning into the right quadrant of the typeface. For example, the numeral "3" above, may be accommodated by two semicircles in the top and bottom right quadrants. Other writing systems may have more elaborate partitioning. As an example, the Tamil "NYA" consonant may be tabulated under a UNICODE Version 2.0 Standard.

TABLE 17

Circular Segments for the Tamil of Consonant "NYA"

| Symbol "NYA" | Writing System | Main | Top | Bottom |
|---|---|---|---|---|
| Consonant | Tamil | | | |
| Partition | Main | E, $+2.5\sigma_z$, W+ | | |
| Subpartition | Center | N, $-2\sigma_z$, S | | S, $-3\sigma_z$, W |
| Subpartition | Right | | | W, $+2\sigma_z$, E |

TABLE 17 discloses circular segments used for constructing the Tamil of consonant "NYA" according to an embodiment of the present invention.

In the Tamil writing system, graphic features may be embedded in a cascading sequence of partitions. The Tamil UNICODE character consonant "NYA" may be encoded by the UNICODE hexadecimal value 0x0B9E as illustrated above. A final enclosing main/main partition curve may encircle the sub-partitions center/main and center/right. The center/main partition may house one circular stroke and may further be partitioned into a top and a bottom with the bottom one housing another circular stroke, which together may resemble the occidental Arabic numeral "6". Another subpartition enclosed by the main/main partition of the consonant 'NYA' may be a right/main sub-partition housing another focus of the circular writing stokes filled in on the right/main-bottom quadrant as part of a sequence resembling the curved portion of the small Latin letter "h" or the occidental Arabic numeral "5".

Elliptical Paths

Elliptical curves may be parameterized in a similar fashion if a radial scaling factor is replaced by two factors representing scaling of major and minor axes of the ellipse relative to an equatorial radius. The choice of offset for the focus of ellipse may depend upon a selection of one of two possibilities that the ellipse provides.

Elliptical paths may not necessarily be featured in Latin block letters because the paths may be mapped to major and minor circles kerned left or right and to minor circles centered in either the upper or the lower quadrant. Elliptical paths are featured, however, in the Latin small print letters and may be even more illustrative in formation of cursive small letters.

A configuration of standard minor ellipsoids in a writing volume is illustrated below to support cursive writing along strict geodesic paths on the ellipsoids. Ellipsoids are used to support cursive handwriting. The unit projection sphere may be deformed to match a typical shape made for small cursive Latin letters having long vertical strokes and short horizontal strokes. Multiple ellipsoids may be used in the volume, wherein each ellipsoid may be oriented along a particular attitude, and wherein a projection of a certain reference geodesic arc may form desired cursive strokes.

The small letter "d" is illustrated below and may be illustrative of construction of other similar letters, such as for example, "a", "b", "c", etc. FIG. 5 illustrates the writing volume according to an embodiment of the present invention having two identically shaped ellipsoids.

One ellipsoid is illustrated having its major Z'-axis rotated slightly from the Z-axis along $+\sigma_y$ to the east of zenith and having one minor Y'-axis parallel to the Y-axis, but offset to the left of the X-axis by half a typographic "em" width. The ellipsoids other minor X'-axis is parallel to the X-axis, but offset to the lower quadrant by half its width, wherein the center of the ellipsoid C' is located away from the center C by an offset of a negative half "em" along the X-axis and by a negative half minor radius along the Y-axis.

Another ellipsoid is illustrated having a major Y"-axis parallel to the Y-axis north and one minor Z"-axis parallel to the Z-axis, but the intersection center C" is offset to the right of the Y-axis by a half "em" width and the X"-axis is collinear with the X-axis.

The two ellipsoids form a conjoined couplet whose intersection accommodates a point grid in the writing volume such that geodesic orbit paths can pass from one ellipsoid to another at the intersections thereof in the left-to-right flow of the Latin alphabet constructions.

The off-zenith Y'-axis inclination of one ellipsoid allows for partitioning the $\sigma_{z'}$ equatorial geodesic orbit into inking and positioning hemispheres. The proportion of ink immersion may be modified by a Z-axis depth offset of its center C'.

The two ellipsoids described above accommodate writing of letters such as small print Latin letters "a" and "d". For letters such as "q" and "g", the two ellipsoids may be reflected about the X-axis, whereas for letters such as "b", the configuration may be reflected about the Y-axis. For letters such as "p", the configuration may be reflected about both the X-axis and Y-axis.

In all four configurations, the major Y"-axis of the second ellipsoid may be inclined slightly along $+\sigma_z$ to support conventional left to right slanting of cursive handwriting. The slant may not be an essential element of the recognition process, however, because the slanting may be associated more with right-handed positioning preferences in a left to right writing system flow or with left-handed positioning preferences in a right to left writing system flow.

Regarding peculiarities of the handwriting of individual writers, an exemplary rendering of a Latin cursive letter "d" is illustrated below to demonstrate how the recognition process according to an embodiment of the present invention works. The geodesic orbit for the first ellipsoid is rotation about Z'-axis. The orbital Inking path in the first ellipsoid's configuration space may be the same as that for the Latin block letter "C" described above. The inking may be performed from the $N'_{-1/\sqrt{2}}$ in the $+\sigma_{z'}$ direction to the $S'_{-1/\sqrt{2}}$ end-point. After that endpoint, the stylus tip may not be repositioned to Z', but rather may continue further along $+\sigma_{z'}$ out of ink ad into a different out of ink orbit of the second ellipsoid along $+\sigma_{x''}$. The $+\sigma_{x''}$ positioning path may follow a major axis geodesic path intersecting the first ellipsoid at the $S'_{-1/\sqrt{2}}$ end-point.

In a non-cursive handwriting print mode, the orientation of the $+\sigma_{x''}$ may be parallel to the orientation of $+\sigma_x$. The down stroke may project as a straight line upon the XY typeface. In a cursive handwriting print mode, the orientation of the $+\sigma_{x''}$ geodesic path may be rotated along $+\sigma_y$ wherein the $+\sigma_{z''}$ axis may be parallel to the inclined Z'-axis. A Z-depth stylus tip depression may regulate the proportion of inking in the $+\sigma_{x''}$ geodesic path. The transition matrix may also be of the same dimension because only Z' and X" are significant with respect to the conjoined ellipsoid configurations.

While the Latin alphabet has been used to exemplify the present invention, it is understood that the present invention may also be used to identify characters of other handwriting and character systems, such as for example, Cyrillic, Tamil, Chinese, Japanese, Korean, glyphs, and hieroglyphics, etc.

In embodiment according to the present invention, the method may comprise recognizing and identifying a collection of reference characters or collections of reference characters corresponding to a plurality of different handwriting styles. Just as a printer's typeset compositor can set a plurality of different font types into a same body of text, mixed handwriting styles may also be recognized and identified during the handwriting analysis process. For example, it is not uncommon for individual writers to use a mix of small and capital letters during handwriting in no particular order, i.e., some writers may always make the letter "e" and capital "E" even when the letter is not ordinarily to be capitalized. Thus, the present invention is adapted to recognize and identify handwriting by evaluation and comparison with a plurality of collections of reference characters.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment(s) disclosed herein, but that the invention includes all of the embodiments falling within the scope of the appended claims.

What is claimed is:

1. A method of text character recognition for a spatial chirographic reading device, the method comprising:
   tracking a path of a stylus tip in a writing volume;
   enclosing the writing volume within at least two projection spheres;
   generating a geometric configuration for the stylus tip path in the writing volume;
   employing the geometric configuration to facilitate spatial recognition of text characters; and
   identifying particular stylus paths related to particular characters being written.

2. The method according to claim 1, further comprising:
   employing a spatial chirographic reading device to collect spatial data for identifying stylus paths for a written character by:
   enumerating all valid inking strokes of a writing system into consistent cardinal point paths;
   translating on-line data points into rotational paths for inking and positioning;
   effecting recognition of a character by comparing a inking path traced by a stylus tip projection ray with reference character inking paths;
   setting an initial path starting point to a zero torsion and a zero radius at a center of the writing volume; and
   determining a plurality of handwriting strokes.

3. The method according to claim 2, wherein determining a plurality of handwriting strokes further comprises:
   associating an initial identification reference position with an initial unit radial-action torsion impulse along a principal Z-axis from the center of the writing volume in a direction to assert one of a positioning in a positive Z-direction and an inking in a negative Z-direction;
   associating a first stylus position with a displacement in the X-Y plane of a unit Z-impulse vector from the center of the typeface plane to a first stylus X-Y position;
   associating the initial identification reference position for a lettering path with a displacement of a unit Z-impulse vector from the center of the typeface plane to the first stylus position;
   associating a second position of the lettering path with a twist-action torsion impulse on the unit Z-impulse vector in a plane orthogonal to a principal X-Y plane to assert a first direction for the stylus tip path in a first osculating plane;
   associating a rotational path of a first path segment with a rotation vector having an X-rotation axis and Y-rotation principal axis components corresponding to twist-action torsion impulse components;
   translating, scaling, and rotating the stylus first position along principal axes X, Y, and Z to partition segment axes X', Y', and Z' aligned as principal axes for cursive lettering; and
   determining an inferred current rotational orbit.

4. The method according to claim 3, wherein determining the inferred current rotational orbit further comprises:
   identifying an effective stroke length by detecting inversions from one of into and out of ink at ends of a path segment;
   applying a third order contact between an inferred rotational orbit and the inferred rotation sphere to calculate a radial action torsion element of the stylus path;
   adjusting a radial action torsion impulse to fit a radius of the inferred rotation sphere for a path segment so that a full-stroke projects a diameter of a stylus path osculating circle to fit a length of an effective length stroke projection;
   recording an inferred center of curvature identified by a derived osculating circle; recording an end-point for an inferred rotational curve; and
   tracking rotation along the inferred rotational orbit.

5. The method according to claim 4, wherein tracking rotation along the inferred rotational orbit further comprises:
   recording an inferred twist action torsional translation of a center of curvature from a previous center of a rotation sphere to a center of curvature of a current path segment;
   recording an inferred radial torsional component impulse used to establish the inferred rotation orbit;
   verifying a stylus tip locus along the inferred rotation orbit;
   incrementing a number of half-strokes as each end-point is traversed; detecting a change of path from a current orbit;
   recording the number of half-strokes traversed along a current inferred orbital path; and
   stopping the incrementing of half-strokes upon detecting a change of path from the current orbit.

6. The method according to claim 5, wherein determining a handwritten writing stroke by detecting a change of path from the current orbit and connecting endpoints with spiral interpolation ligature paths further comprises:
   detecting a twist action torsion component distinct from a recorded twist action torsion component;
   substituting a detected twist action torsion component for an initial torsion component;
   determining an inferred rotational orbit the substituted twist action torsion component; and
   tracking rotation along the inferred rotational orbit.

7. The method according to claim 2, wherein determining the handwritten writing strokes further comprises:
   determining termination of handwriting of a written character by returning the stylus to a home position and ceasing recording significant stylus motion; and
   translating, scaling and rotating axes X', Y', and Z' back to principal orthogonal axes X, Y, and Z for cursive lettering when determining the handwritten writing strokes entailed a transformation of the principal orthogonal axes X, Y, and Z to those of cursive partition segments of the typeface plane.

8. The method according to claim 2, wherein recording reference paths for all allowable characters in the writing system further comprises:
- tabulating resulting path recordings for all valid characters of the writing system;
- storing the resulting path recordings as reference paths for use in recognition of handwritten characters; and
- retrieving the tabulated resulting path recordings for use in recognizing handwritten text by use of the spatial chirographic reading device.

9. The method according to claim 8, wherein employing a spatial chirographic reading device to recognize characters being handwritten with a stylus of the chirographic reading device further comprises:
- collecting handwritten writing strokes associated with a plurality of stylus paths;
- recording the handwritten writing strokes associated with a plurality of stylus paths;
- comparing inking paths traversed by the stylus starting from a first handwritten writing stroke to a last handwritten writing stroke to reference paths tabulated for each character in the writing system; and
- recognizing a text character when an inking portion of a handwritten writing strokes associated with a stylus path matches inking portions of a text character stored in a tabulated reference list of text characters.

10. A method of text character recognition for a spatial chirographic reading device, the method comprising:
- tracking a path of a stylus tip in a writing volume;
- generating a geometric configuration for the stylus tip path in the writing volume;
- employing the geometric configuration to facilitate spatial recognition of text characters;
- identifying particular stylus paths related to particular characters being written;
- converting the path of the stylus tip in the writing volume into a plurality inferred rotations by:
  a. calibrating a font coordinate system;
  b. partitioning the writing volume by an ink depth;
  c. associating partitions of the writing volume with projections;
  d. enclosing the writing volume within at least two projection spheres;
  e. deriving the plurality of inferred rotations for an inverse projection ray rotation upon an enclosing sphere;
  f. defining a cardinal attitude reference sphere for the inferred rotations;
  g. graduating principal orthogonal rotational paths; and
- recording a plurality of reference paths for a plurality of characters of a writing system.

11. The method according to claim 10, wherein calibrating the font coordinate system further comprising:
- assigning a font face area to a writing surface of the writing volume, the writing surface containing a plurality of writing symbols in the writing system within the font face area;
- affixing a font origin at one of a center of the writing surface and a position situated at least a distance below the writing surface;
- projecting a conical ray from the affixed font origin to the stylus tip to a point situated above a typeface plane;
- locating a projection plane above the writing surface;
- separating the projection plane from the writing surface by a small radial ink depth distance along a cone generator;
- using the writing surface as a guide parallel to an X-Y projection plane;
- restricting the path of the stylus tip below an ink depth with the writing surface;
- assigning a direction of one edge of the writing surface to a Cartesian X-axis;
- assigning another direction of another edge of the writing surface to a Cartesian Y-axis; and
- assigning a ray direction of another conical ray from the font origin through a middle of the typeface plane to a Cartesian Z-axis.

12. The method according to claim 10, wherein partitioning the writing volume by the ink depth further comprises:
- associating a location above the ink depth of the stylus tip with a positioning handwriting stroke; and
- associating another location within the ink depth of a stylus tip with an inking handwriting stroke.

13. The method according to claim 10, wherein associating the partitions of the writing volume with projections further comprises:
- associating a stylus tip location in positioning depths with a first stereographic projection having rays from a first projection pole at the font origin through the stylus tip location to a point on a projection sphere above the writing volume; and
- associating another stylus tip location in inking depths with a second stereographic projection having rays from a second projection pole located above the writing volume through the another stylus tip location to another point on a second spherical surface below the projection plane and equal in distance as the first projection pole from the projection plane to the font origin and being opposite in direction.

14. The method according to claim 10, wherein enclosing the writing volume within at least two projection spheres further comprises:
- joining the at least two projection spheres wherein the at least two projection spheres intersect at the typeface plane forming a projection disc volume; and
- sizing the at least two projection spheres wherein the writing volume is formed and contained within the projection disc volume.

15. The method according to claim 10, wherein deriving the inferred rotation of the inverse projection ray rotation upon an enclosing sphere further comprises:
- converting stylus tip motions within a semi-disc into inferred rotation paths traced upon semi-disc surfaces by a projection ray associated with the stylus tip;
- converting stylus tip motions crossing an intersection plane at an intersection boundary circle into inferred rotations along meridian great circles; and
- converting stylus tip motions crossing the intersection plane at points other than the intersection boundary circle into inversions between the at least two projection hemispheres.

16. The method according to claim 10, wherein defining the cardinal attitude reference sphere for the inferred rotations further comprises:
- choosing a cardinal center of the writing volume for the inferred rotations;
- enclosing an attitude sphere about the cardinal center, wherein the cardinal center contacts corners of the typeface plane; and
- obtaining a cardinal direction from an attitude ray emanating from the chosen cardinal center to three rectilinear orthogonal axes of the writing volume.

17. The method according to claim 10, wherein graduating the principal orthogonal rotational paths further comprises:
- assigning origin to a center of an attitude sphere;

assigning unity to one radial position from the center in positive orthogonal axes using radial torsion; and adding a unit of rotation for each $\pi/2$ radian rotation of a unit radial position around the unit radial position axis of rotation.

18. The method according to claim 10, wherein employing the geometric configuration to facilitate spatial recognition of text characters further comprises:

labeling end points of the path of the stylus tip with a minimum number of reference rotational paths;

limiting the number of reference rotational paths employed;

partitioning a typeface plane into multiple segments; and connecting reference end-points with interpolation ligatures.

19. The method according to claim 18 wherein labeling the end points of the path of the stylus tip with a minimum number of reference rotational paths further comprises:

selecting rotations about a center of the writing volume having orthogonal axes corresponding to principal orthogonal X, Y and Z axes, by one of path-connecting rotations with common path intersection points, path-connecting rotations with positioning path segments along a rotational orbit, path-connecting rotations with inversion from a positioning end-point to an initial point of an inking path at a typeface location;

selecting a radius of curvature for an osculating sphere for minimal rotation paths, wherein path connecting end-points lie on a sphere; and providing a non-minimal number of additional representations of rotation paths by partitioning the typeface plane into segments, eliminating ambiguity of path labels, and simplifying path labels in segmented partitions.

20. The method according to claim 19, wherein limiting the number of reference rotational paths employed further comprises limiting the number of reference rotational paths employed to a minimum number to uniquely identify inking strokes for characters belonging a particular writing system, wherein a full stroke is rendered observable as a $\pi$ radian rotation of an osculating circle on an inferred rotation sphere, the full stroke adapted to extend beyond a typeface dimension, the full stroke being fitted into a partition of the typeface plane and being scaled to render the full stroke observable as a $\pi$ radian rotation.

21. The method according to claim 18, wherein partitioning the typeface plane into multiple segments further comprises:

providing added segments each having a set of three principal orthogonal axes supporting a plurality of orthogonal rotational paths of the writing system images;

ensuring that each partition reflects a distinct translation of origin, scaling of radius of curvature, and rotation of orientation of the set of three principal orthogonal axes;

graduating the set of three principal orthogonal axes of each partition segment with one unit traversal of path segment in one quarter of a full rotation in each orthogonal axis about a center of curvature;

using a minimal number of partitions of a principal segment to provide a minimum number of additional path end-points for inking paths; and limiting reference rotational paths employed in each partition segment to a minimum required by the writing system.

22. The method according to claim 18, wherein connecting reference endpoints with interpolation ligatures further comprises:

extending path-connected segments to continuous connection between differing orbital rotations at common end-points by applying at a point of contact a finite inferred torsional impulse:

changing an orbital radius of curvature from that of a first orbital path to a second orbital path when connected orbit radii differ;

changing an orbital center of rotation from that of the first orbital path to the second orbital path when the orbital paths have differing polar axes at the contact point;

changing an orientation of an orbital rotation plane from the first orbital path to the second orbital path when the orbital paths are non-coplanar at the contact point; and connecting successive orbital paths between differing partitions when not point-connected by interpolating with a ligature path, wherein the ligature path effects the inferred torsional impulse.

23. The method according to claim 10, wherein identifying particular stylus paths related to particular characters being written further comprises:

identifying at least one straight line writing stroke; and identifying at least one curved line writing stroke.

24. The method according to claim 23, wherein identifying at least one straight line writing stroke further comprises:

identifying the at least one straight line writing stroke through a center of a typeface plane;

identifying the at least one straight line writing stroke along an edge of the typeface plane;

identifying the at least one straight line writing stroke not passing through one vertex of the typeface plane away from the center of the typeface plane and a mid-point of a typeface edge;

identifying the at least one straight line writing stroke connected to one point of the typeface edge away from the center of the typeface edge; and identifying another straight line writing stroke disposed away from the typeface edge.

25. The method according to claim 24, wherein identifying the at least one straight line writing stroke through a center of a typeface plane further comprises:

identifying the at least one straight line writing stroke with a rotation around an inferred sphere of rotation along a great meridian circle through a Zenith pole on a positive Z-axis in a positioning directional attitude and through a Nadir pole on a negative Z-axis in inking directional attitude;

identifying the at least one straight line writing stroke along a principal axis of the typeface plane;

identifying the at least one straight line writing stroke along a diagonal axis of the typeface plane; and identifying the at least one straight line writing stroke disposed away from the principal axes and away from diagonals of the typeface plane.

26. The method according to claim 24, wherein identifying at least one straight line writing stroke along an edge of the typeface plane further comprises:

identifying the at least one straight line writing stroke along edges of the typeface plane with a parallel principal axis;

associating a rotation of a great circle along the parallel principal axis with a parallel rotation of a minor circle at the typeface edge;

fixing a constant value to a perpendicular translation distance from a parallel principal axis great circle typeface center to the minor circle at the typeface edge; and identifying a span of the at least one straight line writing stroke along the edges of the typeface plane with a diameter of a minor parallel circle at a line of a rotation sphere through typeface vertices.

27. The method according to claim 24, wherein identifying the at least one straight line writing stroke away from the center of the typeface plane passing through one of a vertex of the typeface plane and a mid-point of the typeface plane edge further comprises:
associating the at least one straight line writing stroke with a minor circle of an inferred rotation sphere and with a major circle of the inferred rotation sphere lying parallel to the at least one straight line writing stroke and translated from the center of the typeface plane by an offset from the center of the typeface plane to a minor circle center of curvature;
associating the minor circle of the inferred rotation sphere with an inferred latitude angle made by a radial line from a point on the minor circle of the inferred rotation sphere to a center of the inferred rotation sphere and a plane of a parallel great circle;
identifying a span of the at least one straight line writing stroke with an upward scaling of a radius of the great circle wherein the minor circle connects to at least one edge of the typeface plane; and
associating the span and offset of the at least one straight line writing stroke with a segmentation of the typeface plane fitting an edge and a quadrant of a path-connected edge of the typeface plane.

28. The method according to claim 27, wherein identifying the at least one straight line writing stroke with a minor circle further comprises:
associating with the at least one straight line writing stroke with a minor circle end-points falling within the typeface plane;
associating the at least one straight line writing stroke with a minor circle of the inferred rotation sphere;
associating the at least one straight line writing stroke with a minor circle of the inferred rotation sphere lying parallel to the at least one straight line writing stroke being translated from the center of the typeface plane by an offset to a center of curvature;
associating the minor circle with an inferred latitude angle made by a radial line from a point on the minor circle to a center of the inferred rotation sphere and the plane of a parallel great circle;
identifying a span of the at least one straight line writing stroke with a minor circle with a downward scaling of a radius of the parallel great circle such that the minor circle connects to two points of inversion lying within the typeface plane;
associating a rotational translation of $\pi$ radians in a traversal of a path between the two inversion points at end-points of the at least one straight line writing stroke; and
associating the span and offset of the at least one straight line writing stroke with a segmentation of the typeface plane situated within the typeface plane and centered at a midpoint of the at least one straight line writing stroke.

29. The method according to claim 25, wherein identifying the at least one straight line writing stroke along the principal axis of the typeface plane further comprises:
identifying a span of the at least one straight line writing stroke along a principal axis of the typeface plane with one length from the center of the typeface plane to the mid-point of the typeface plane edge; and
identifying the rotation sphere of one length radius for the span of the at least one straight line writing stroke through the center of the typeface plane along the principal axis of the typeface plane.

30. The method according to claim 25, wherein identifying the at least one straight line writing stroke along a diagonal axis of the typeface plane further comprises:
identifying a span of the at least one straight line writing stroke through the center of the typeface plane along a diagonal axis to a vertex of the typeface plane using a Pythagorean hypotenuse defined by a right triangle completed with one length of a right principal axis side from the center of the typeface plane to the mid-point of typeface plane edge and another side from the mid-point of typeface plane edge along the typeface plane edge to the vertex connecting the typeface plane edge to the diagonal axis;
identifying a rotation sphere of radius scaled by a modulus of the Pythagorean hypotenuse defined by the right triangle for the span of the at least one straight line writing stroke through the center of the typeface plane along a diagonal axis of the typeface plane from the center of the typeface plane to the vertex of the typeface plane; and
identifying a rotation sphere of unit radius scaled by a modulus $|2^{1/2}|$ of the Pythagorean hypotenuse defined by a unit right triangle for a unit span of the at least one straight line writing stroke through a center of a unit square typeface plane along a diagonal axis of the typeface plane from the center of the typeface plane to the vertex of the typeface plane.

31. The method according to claim 25, wherein identifying the at least one straight line writing stroke away from the principal axes and away from diagonals of the typeface plane further comprises:
identifying the at least one straight line writing stroke with a rotation around a meridian great circle of an angularly nearer principal axis to the meridian great circle at an inclination of the at least one straight line;
identifying an angle of inclination between the at least one straight line and the angularly nearer principal axis;
identifying a rational number scaling of sides of the typeface plane according to a ratio determined by a trigonometric tangent of an angle between the angularly closer principal axis and an inclined at least one straight line writing stroke;
identifying a sign of a rational number scale to be positive when an inclination of the meridian great circle is clockwise rotated from the angularly nearer principal axis;
identifying the sign of the rational number scale to be negative when the inclination of the meridian great circle is anti-clockwise rotated from the angularly nearer principal axis;
identifying a unit span of the at least one straight line writing stroke through the center of the typeface plane away from the principal axis and away from diagonals of the typeface plane with one length from the center of the typeface plane to an intersection point of the typeface plane edge and the principal axis; and
identifying an absolute span of the at least one straight line writing stroke through the center of the typeface plane away from the principal axis and away from diagonals of the typeface plane with a radius of the great meridian circle of the at least one straight line writing stroke changed from a radius of an adjacent principal axis great circle by rotational number scaling of an inclination of the at least one straight line writing stroke as a proportion of the rotational number scaling for rotation of an adjacent principal axis to the diagonal of the typeface plane.

32. The method according to claim 23, wherein identifying curved line writing strokes further comprises:
- identifying circular line writing strokes;
- identifying conic section line writing strokes; and
- identifying cursive line writing strokes.

33. The method according to claim 32, wherein identifying circular line writing strokes further comprises:
- detecting a curvature in the X-Y plane with four successive stylus tip position readings and maintaining a constant curvature for a significant number of subsequent position readings;
- determining a center of a circle with a selection of three non-collinear points from a set of constant curvature position readings;
- identifying the circular line writing stroke via rotation of the inferred rotation sphere in the typeface plane around an orthogonal Z-axis;
- identifying a maximal circular line writing stroke with a great circle of the inferred rotation sphere perpendicular to an axis line connecting the Zenith and the Nadir;
- identifying smaller central circles via parallel translation of an equatorial circle parameterized by parallel latitude; and
- identifying circles away from the center of the typeface plane with circles parallel to the equatorial circle and having an offset translation of orthogonal axes from a center of the principal axes.

34. The method according to claim, 32, wherein identifying conic section line writing strokes further comprises:
- detecting at least three non-collinear stylus position readings within one elliptical path in the X-Y plane to solve for quadratic equation coefficients corresponding to writing system conic shapes used;
- associating the inferred rotation sphere with an ellipsoid of handwritten writing stroke paths; and
- identifying conic section shapes corresponding to circular shapes of the inferred rotation sphere after performing a change of coordinates.

35. The method according to claim 34, wherein identifying general conic section shapes corresponding to circular shapes of the inferred rotation sphere after performing a change of coordinates further comprises:
- scaling a first principal axis of the typeface plane with a major axis of the ellipsoid;
- scaling a second principal axis of the typeface plane with a minor axis of the ellipsoid;
- rotating the first and second scaled principal axes to coincide with an orientation of major and minor axes of the ellipsoid; and
- translating the first and second rotated and scaled principal axes so that rotation planes of a transformed inferred rotation sphere coincide with ellipsoidal handwritten writing strokes.

36. The method according to claim 32, wherein identifying cursive line writing strokes further comprises:
- identifying cursive lettering corresponding to multiple conic section configurations;
- identifying for each offset scaled and rotated set of orthogonal axes used to convert conic paths into circular and straight line projections; and
- connecting end-points with spiral interpolation ligature paths.

* * * * *